US010713814B2

(12) United States Patent
De Villers-Sidani et al.

(10) Patent No.: US 10,713,814 B2
(45) Date of Patent: *Jul. 14, 2020

(54) EYE TRACKING METHOD AND SYSTEM

(71) Applicant: INNODEM NEUROSCIENCES, Outremont (CA)

(72) Inventors: Etienne De Villers-Sidani, Outremont (CA); Paul Alexandre Drouin-Picaro, Montreal (CA)

(73) Assignee: INNODEM NEUROSCIENCES, Outremont (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,062

(22) Filed: Jun. 7, 2019

(65) Prior Publication Data

US 2019/0295287 A1 Sep. 26, 2019

Related U.S. Application Data

(63) Continuation of application No. 16/283,360, filed on Feb. 22, 2019.

(Continued)

(51) Int. Cl.
*G09G 5/00* (2006.01)
*G06T 7/73* (2017.01)
(Continued)

(52) U.S. Cl.
CPC ............... *G06T 7/73* (2017.01); *G06F 3/011* (2013.01); *G06F 3/013* (2013.01); *G06F 3/0304* (2013.01);
(Continued)

(58) Field of Classification Search
CPC .......... G06F 3/011; G06F 3/012; G06F 3/013; G06F 3/0304; G09G 5/391; G09G 2340/0407
See application file for complete search history.

(56) References Cited

U.S. PATENT DOCUMENTS 5,850,211 A 12/1998 Tognazzini
6,381,345 B1 3/2002 Swain
(Continued)

FOREIGN PATENT DOCUMENTS

CN 108038466 A 5/2018
CN 109685829 A 2/2019

OTHER PUBLICATIONS

Kyle Krafka and Aditya Khosla and Petr Kellnhofer and Harini Kannan and Suchendra Bhandarkar and Wojciech Matusik and Antonio Torralba, Eye Tracking for Everyone, 2016, IEEE Conference on Computer Vision and Pattern Recognition (CVPR), http://gazecapture.csail.mit.edu/index.php.

(Continued)

*Primary Examiner* — Vijay Shankar
(74) *Attorney, Agent, or Firm* — Benoit & Cote, Inc.; C. Marc Benoit; Charles-André Carson

(57) ABSTRACT

A computer-implemented method for determining a gaze position of a user, comprising: receiving an initial image of at least one eye of the user; extracting at least one color component of the initial image to obtain a corresponding at least one component image; for each component image, determining a respective internal representation; determining an estimated gaze position in the initial image by applying a respective primary stream to obtain a respective internal representation for each of the at least one component image; and outputting the estimated gaze position. The processing of the component images is performed using a neural network configured to, at run time and after the neural network has been trained, process the component images using one or more neural network layers to generate the estimated gaze position. A system for determining a gaze position of a user is also provided.

20 Claims, 15 Drawing Sheets

Related U.S. Application Data

(60) Provisional application No. 62/633,646, filed on Feb. 22, 2018.

(51) Int. Cl.
*G06K 9/00* (2006.01)
*G06T 7/90* (2017.01)
*G06K 9/62* (2006.01)
*G06F 3/01* (2006.01)
*G06F 3/03* (2006.01)

(52) U.S. Cl.
CPC ..... *G06K 9/00281* (2013.01); *G06K 9/00597* (2013.01); *G06K 9/6262* (2013.01); *G06T 7/90* (2017.01); *G06T 2207/10024* (2013.01); *G06T 2207/20084* (2013.01); *G06T 2207/30201* (2013.01)

(56) References Cited

U.S. PATENT DOCUMENTS

| | | | |
|---|---|---|---|
| 6,456,262 B1 | 9/2002 | Bell | |
| 7,046,924 B2 * | 5/2006 | Miller | G02B 27/017 348/231.3 |
| 7,206,022 B2 * | 4/2007 | Miller | G02B 27/0093 348/231.3 |
| 7,444,017 B2 | 10/2008 | Gallagher | |
| 8,340,365 B2 | 12/2012 | Thorn et al. | |
| 8,594,374 B1 | 11/2013 | Bozarth | |
| 8,643,680 B2 | 2/2014 | Baldwin et al. | |
| 9,092,051 B2 | 7/2015 | Park et al. | |
| 9,311,527 B1 | 4/2016 | Yin et al. | |
| 9,355,315 B2 | 5/2016 | Vugdelija et al. | |
| 9,454,225 B2 | 9/2016 | Bychkov et al. | |
| 10,169,846 B2 * | 1/2019 | Stafford | G06F 3/013 |
| 10,192,528 B2 * | 1/2019 | Young | G09G 5/391 |
| 2003/0146901 A1 | 8/2003 | Ryan | |
| 2006/0256083 A1 | 11/2006 | Rosenberg | |
| 2008/0273763 A1 | 11/2008 | Martin et al. | |
| 2010/0079508 A1 | 4/2010 | Hodge et al. | |
| 2011/0115883 A1 | 5/2011 | Kellerman et al. | |
| 2014/0129987 A1 | 5/2014 | Feit et al. | |
| 2015/0164319 A1 | 6/2015 | Kim et al. | |
| 2016/0026246 A1 | 1/2016 | Strupczewski et al. | |
| 2016/0109945 A1 | 4/2016 | Kempinski | |
| 2016/0116980 A1 | 4/2016 | George-Svahn et al. | |
| 2016/0202756 A1 | 7/2016 | Wu et al. | |
| 2016/0216761 A1 | 7/2016 | Klingström et al. | |
| 2017/0287112 A1 * | 10/2017 | Stafford | G06F 3/013 |
| 2018/0125404 A1 | 5/2018 | Bott et al. | |

OTHER PUBLICATIONS

David Bäck, Neural Network Gaze Tracking using Web Camera, Dec. 16, 2005, LiTH-IMT/MI20-EX—05/414—SE, https://www.diva-portal.org/smash/get/diva2:21388/FULLTEXT01.pdf.

Xucong Zhang, Yusuke Sugano, Mario Fritz, Andreas Bulling, Perceptual User Interfaces Group, Scalable Learning and Perception Group, Max Planck Institute for Informatics, Appearance-Based Gaze Estimation in the Wild, Apr. 11, 2015, https://arxiv.org/pdf/1504.02863.pdf.

Qiong Huang, Student Member, IEEE,, Ashok Veeraraghavan, Member, IEEE,, and Ashutosh Sabharwal, Fellow, IEEE, TabletGaze: Unconstrained Appearance-based Gaze Estimation in Mobile Tablets, Sep. 5, 2015, https://www.ece.rice.edu/~av21/Documents/2015/TabletGaze.pdf, arXiv:1508.01244v2 [cs.CV].

Published on Feb. 15, 2016, Fundación Vodafone España, Mobile Application—EVA Facial Mouse, https://www.youtube.com/watch?v=ED4EgNoB8hs.

Khalid, Laila, International Searh Report PCT/CA2019/050218. Form PCT/ISA/210. dated Jun. 7, 2019, 4 pages.

\* cited by examiner

EYE TRACKING METHOD AND SYSTEM

CROSS-REFERENCE TO RELATED APPLICATIONS

This application is a continuation of U.S. patent application Ser. No. 16/283,360 filed Feb. 22, 2019, which claims benefit from U.S. provisional patent application 62/633,646 filed Feb. 22, 2018, the specification of which is hereby incorporated herein by reference in its entirety.

TECHNICAL FIELD

The present invention generally relates to eye tracking methods and systems, and more particularly relates to gaze tracking methods and systems using a camera and not requiring any other tracking device.

BACKGROUND

Eye movements are extremely fast and precise and remain largely intact in several neurological and medical conditions causing generalized weakness and inability to speak and write. Such relatively common conditions include strokes, amyotrophic lateral sclerosis (Lou Gehrig's disease), inflammatory polyneuropathies and intubation due to critical illness, etc.

Communication with eye movements alone could also be valuable for virtual reality, gaming, marketing and in various environments where speaking is not possible or desirable.

Several eye-tracking solutions have been proposed. Some of them typically require the use of dedicated hardware such as infrared cameras, thereby reducing their availability and increasing the cost of such technology. For example, eye tracking systems designed for paralyzed individuals are so expensive that they are unaffordable for most patients and clinical units.

A few experimental systems using ambient light only and ordinary webcams exist but their performance is poor when lighting conditions are degraded (dim/side lighting) or when the facial features of the user are not strictly controlled (face not perpendicular to the camera, light eye color, dark skin color, etc.).

Capturing eye movements with an ordinary mobile device camera may be challenging because of elements such as the many degrees of freedom of such systems including parallel movements of the head and eyes, the changing lighting conditions, the variability in eye and face shape and color, the sampling rate limitations of ordinary mobile device cameras, and/or the processor speed limitations of mobile devices.

Therefore, there is a need for an improved eye tracking method and system that may operate under ambient light conditions.

SUMMARY

According to an aspect of the invention, there is provided a computer-implemented method for determining a gaze position of a user, comprising:

receiving an initial image of at least one eye of the user;

extracting at least one color component of the initial image to obtain a corresponding at least one component image;

applying a respective primary stream to each one of the at least one component image to obtain a respective internal representation for each one of the at least one component image;

determining an estimated gaze position for the initial image using the respective internal representation for each of the at least one component image; and outputting the estimated gaze position.

According to an embodiment, said applying the primary stream to obtain the respective internal representation and said determining an estimated gaze position are performed in combination and comprise:

processing the at least one component image using a neural network, at least one portion of the neural network being the respective primary stream respective to each of the at least one component image, wherein the neural network is implemented by one or more computers and comprises one or more neural network layers, and wherein the neural network is configured to, at run time and after the neural network has been trained, process the at least one component image using the one or more neural network layers to generate the estimated gaze position.

According to an embodiment, said applying the respective primary stream to obtain the respective internal representation is performed separately for each of the at least one component image, and comprises at least one fully-connected layer for each one of the at least one component image.

According to an embodiment, applying the respective primary stream to obtain the respective internal representation comprises at least one convolutional layer.

According to an embodiment, each respective primary stream comprises at least one fully-connected layer downstream the at least one convolutional layer.

According to an embodiment, the neural network comprises another portion, namely an internal stream, downstream the respective primary stream, wherein said determining an estimated gaze position is performed using the internal stream comprising at least one fusion layer, the internal stream having at least one fully-connected layer.

According to an embodiment, the internal stream starts at a fusion layer receiving at least the respective internal representation and further comprises an output layer downstream the fusion layer and comprising at least one fully-connected layer.

According to an embodiment, said extracting at least one color component comprises extracting at least two distinct color components of the initial image to obtain at least two corresponding component images, and further wherein said determining an estimated gaze position comprises combining each of the respective internal representations together using weight factors.

According to an embodiment, said extracting at least one color component comprises extracting each of three RGB components of the initial image.

According to an embodiment, the received initial image contains additional features other than the at least one eye.

According to an embodiment, there is further provided:

identifying the at least one eye within the received initial image; and extracting a portion of the initial image containing only the at least one eye, thereby obtaining a cropped image, wherein said extracting at least one color component is performed in the cropped image to obtain the corresponding at least one component image.

According to an embodiment, said identifying the at least one eye is performed using a facial feature or landmark recognition method.

According to an embodiment, said identifying the at least one eye comprises identifying at least one of: an outline of the at least one eye, a position of at least one of a limbus, an iris and a pupil of the at least one eye.

According to an embodiment, said extracting at least one color component comprises extracting at least two distinct color components of the initial image to obtain at least two corresponding component images, the method further comprising:

for each of the at least two corresponding component images, determining an illuminant value representative of the relative contribution of the each of the at least two corresponding component images to the initial image, wherein said determining an estimated gaze position further comprises combining the illuminant values with the respective internal representation of the at least one component image.

According to an embodiment, the illuminant values are processed using an illuminant neural network comprising one or more fully-connected neural network layers.

According to an embodiment, the received initial image further contains at least one facial landmark, the method further comprising:

extracting the at least one facial landmark to obtain a corresponding at least one landmark position;

wherein said determining an estimated gaze position further comprises combining the at least one landmark position with the respective internal representation of the at least one component image.

According to an embodiment, said combining is performed using a landmark neural network comprising one or more fully-connected neural network layers.

According to an embodiment, said determining an estimated gaze position comprises independently determining each of a first coordinate and a second coordinate of the estimated gaze position.

According to an embodiment, there is further provided:

receiving at least one calibration image of the user associated with a calibration position; and determining and outputting a calibrated estimated gaze position based on said at least one calibration image.

According to an embodiment, said determining and outputting a calibrated estimated gaze position comprises determining each of a first coordinate and a second coordinate independently.

According to an embodiment, said determining and outputting a calibrated estimated gaze position is performed using one of: a calibration neural network comprising one or more fully-connected neural network layers, a ridge regression, decision trees, a support vector machine, and a linear regression.

According to an embodiment, there is further provided:

determining an orientation of the initial image relative to a reference;

wherein said determining an estimated gaze position are performed for a predetermined one orientation of the initial image.

According to an embodiment, there is further provided acquiring the initial image of at least one eye of the user using a camera.

According to an embodiment, there is further provided determining the estimated gaze position relative to a screen of an electronic device using a referential transformation, comprising querying screen properties of the electronic device for performing the referential transformation, and performing user interactions with the electronic device based on the determining the estimated gaze position relative to the screen of the electronic device.

According to another aspect of the invention, there is provided a computer program product for determining a gaze position of a user, the computer program product comprising a computer readable memory storing computer executable instructions thereon that when executed by a computer perform the method steps of any one of the methods above.

According to another aspect of the invention, there is provided a system for determining a gaze position of a user, the system comprising a communication unit for at least one of receiving and transmitting data, a memory and at least one processing unit configured for executing the method steps of any one of the methods above.

According to another aspect of the invention, there is provided a system for determining a gaze position of a user, comprising:

an extracting unit configured for receiving an initial image of at least one eye of the user and extracting at least one color component of the initial image to obtain a corresponding at least one component image;

an internal representation determining unit configured for applying a respective primary stream to each one of the at least one component image to obtain a respective internal representation for each one of the at least one component image; and a gaze position estimating unit configured for determining an estimated gaze position in the initial image according to the respective internal representation of each of the at least one component image and outputting the estimated gaze position.

According to an embodiment, the internal representation determining unit and the gaze position estimating unit are part of a neural network implemented by one or more computers and comprising one or more neural network layers, and wherein the neural network is configured to, at run time and after the neural network has been trained, process the at least one component image using the one or more neural network layers to generate the estimated gaze position.

According to an embodiment, the neural network comprises:

at least one first neural network stream, each being configured to generate the respective internal representation; and a second neural network stream configured to generate the estimated gaze position.

According to an embodiment, each of the at least one first neural network stream comprises at least one fully-connected layer.

According to an embodiment, each of the at least one first neural network stream comprises at least one convolutional layer.

According to an embodiment, each of the at least one first neural network stream further comprises at least one fully-connected layer downstream the corresponding at least one convolutional layer.

According to an embodiment, the second neural network stream comprises at least one fusion layer, each of the at least one fusion layer having at least one fully-connected layer.

According to an embodiment, the second neural network stream further comprises an output layer downstream the at least one fusion layer and comprising at least one fully-connected layer.

According to an embodiment, the extracting unit is configured for extracting at least two distinct color components of the initial image to obtain at least two corresponding component images, and wherein said gaze position estimating unit is configured for combining each of the respective gaze positions together using weight factors.

According to an embodiment, the extracting unit is configured for extracting each of three RGB components of the initial image.

According to an embodiment, the received initial image contains additional features other than the at least one eye.

According to an embodiment, the extracting unit is further configured for:

identifying the at least one eye within the received initial image;

extracting a portion of the initial image containing only the at least one eye to obtain a cropped image; and extracting the at least one color component of the cropped image to obtain the corresponding at least one component image.

According to an embodiment, the gaze position determining unit is configured for identifying the at least one eye using a facial feature or landmark recognition method.

According to an embodiment, the gaze position determining unit is configured for identifying at least one of: an outline of the at least one eye, a position of at least one of a limbus, an iris and a pupil for the at least one eye.

According to an embodiment, the extracting unit is further configured for, for each of the component images, determining an illuminant value representative of the relative contribution of each one of the at least one component image to the initial image, and wherein said gaze position estimating unit is configured for combining each illuminant value with the respective gaze positions.

According to an embodiment, there is further provided an illuminant neural network comprising one or more fully-connected neural network layers and configured to process the illuminant values and generate illuminant data for transmission to the gaze position estimating unit.

According to an embodiment, the received initial image further contains at least one facial landmark, and wherein the extracting unit is further configured for extracting the at least one facial landmark to obtain a corresponding at least one landmark position, and further wherein the gaze position estimating unit is further configured for combining the at least one landmark position with the respective gaze positions.

According to an embodiment, there is further provided a landmark neural network comprising one or more fully-connected neural network layers and configured to process the at least one landmark position and generate landmark data for transmission to the gaze position estimating unit.

According to an embodiment, the first and second neural network streams are configured to process each of a first coordinate and a second coordinate of the estimated gaze position independently.

According to an embodiment, there is further provided a calibration model comprising one of: a calibration neural network, a ridge regression, decision trees, a support vector machine, or a linear regression, configured to determine and output a calibrated estimated gaze position.

According to an embodiment, the calibration model is configured to process each of a first coordinate and a second coordinate of the calibrated estimated gaze position independently.

According to an embodiment, there is further provided an image orientation determination module for determining an orientation of the initial image relative to a reference, and wherein the gaze position estimating unit each comprises four orientation modules, each being configured for processing the initial image for a predetermined one orientation of the initial image.

According to an embodiment, there is further provided a camera for acquiring the initial image of at least one eye of the user.

According to an embodiment, there is further provided an electronic device having a screen to which estimated gaze position relates.

According to an embodiment, the electronic device comprises the camera.

According to an embodiment, the electronic device comprises the computer program product, described above, installed thereon.

According to an embodiment, the computer program product is operated in the electronic device to perform user interactions with the electronic device based on the gaze tracking.

According to another aspect of the invention, there is provided a computer-implemented method for determining a gaze position of a user, comprising:

receiving an initial image of at least one eye of the user;

extracting at least one color component of the initial image to obtain a corresponding at least one component image;

for each one of the at least one component image, determining a respective gaze position;

determining an estimated gaze position in the initial image according to the respective gaze position of each of the at least one component image; and outputting the estimated gaze position.

According to an embodiment, said determining a respective gaze position comprises performing a regression method.

According to an embodiment, said determining an estimated gaze position comprises performing a regression method.

BRIEF DESCRIPTION OF THE DRAWINGS

Further features and advantages of the present invention will become apparent from the following detailed description, taken in combination with the appended drawings, in which.

Further details of the invention and its advantages will be apparent from the detailed description included below.

DETAILED DESCRIPTION

In the following description of the embodiments, references to the accompanying drawings are by way of illustration of examples by which the invention may be practiced. It will be understood that other embodiments may be made without departing from the scope of the invention disclosed.

Figure 1:
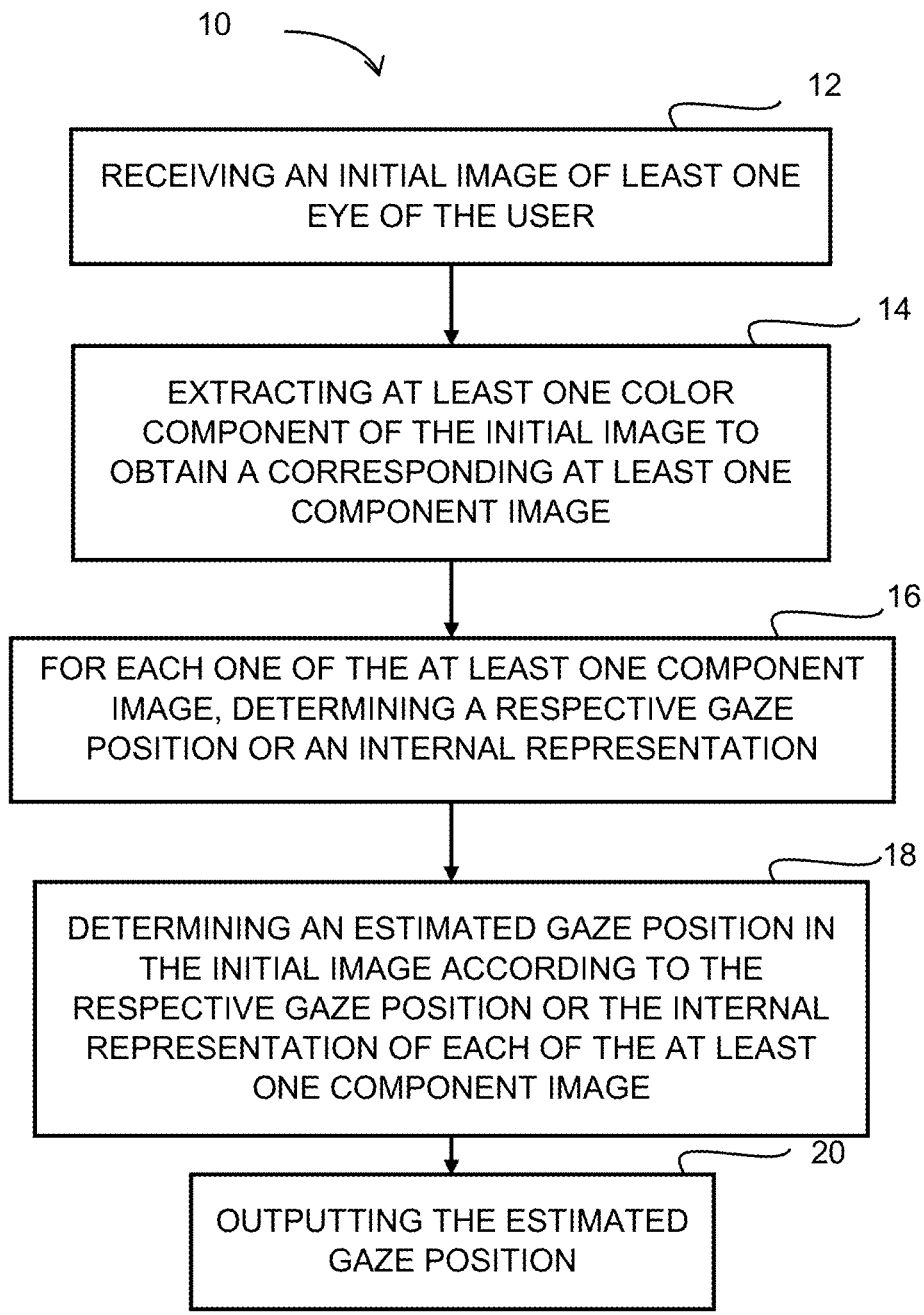
FIG. 1 is a flow of chart illustrating a method for determining a gaze position of a user, according to one embodiment.

FIG. 1 illustrates a method 10 for determining a gaze position of a user from an initial image, according to one embodiment. As it will be detailed below, in one embodiment, the method 10 is executed by a computer machine provided with at least a processing unit, a memory and a communication unit. The image of the user may be taken using a camera which may be integrated in a mobile and/or portable device such as a smartphone, a tablet, a phablet, a laptop, a computer machine provided with a camera such as a webcam, or the like, or any dedicated device enabling to obtain images of the user. In one embodiment wherein a calibration procedure has to be performed, a display should be provided to the user, for example the display of the used mobile and/or portable device.

As it will become apparent below, in some embodiments, the method is implemented in using neural networks. Neural networks are machine learning models that employ one or more subsequent layers of non-linear units to predict an output for a received input. Using neural networks conveniently trained enables to greatly improve the accuracy of the determination of the gaze position. The skilled addressee will however appreciate that simpler regression algorithms conveniently implemented may be considered for specific applications, but accuracy of the determination of the position may not be sufficiently satisfactory, as detailed below.

In the following description, the method and associated system for determining the gaze position of a user will first be described in a basic architecture using simple regression algorithms, according to some embodiments. More complex architectures using neural networks will be described later with reference to FIGS. 15 to 20.

At step 12 of the method 10, an initial image of at least one eye of the user is received. In one embodiment, the initial image comprises only the eyes of the user. In another embodiment, the received initial image comprises the two eyes of the user. In a further embodiment, the received initial image also comprises other facial features in addition to the eyes of the user, as detailed below. For example, the initial image may comprise eyebrows, ears, a nose, a mouth, etc. In another embodiment, the initial image comprises the whole face of the user.

At step 14, at least one color component is extracted from the initial image to obtain a corresponding at least one component image. In one embodiment, two color components are extracted from the initial image to obtain two corresponding component images. In a further embodiment three color components are extracted from the initial image to obtain three corresponding component images. Indeed, in one embodiment, the initial image of the eye of the user is an RGB (Red-Green-Blue) image provided with a red channel, a green channel and a blue channel. In this exemplary RGB example, a single color channel is selected to build the corresponding component image. More particularly, the decimal code associated with each pixel of the initial image received at step 12 comprises a red value, a green value and a blue value. The red image is generated by taking into account only the red value of the pixels of the initial image, i.e. the red image comprises the same array of pixels as that of the initial image but the green and blue values of the pixels are not taken into account so that only the red value of the decimal code remains associated with each pixel. The red image represents the same image as the initial image but only in red color. Similarly, the green image is generated by taking into account only the green value of the pixels of the initial image, i.e. the green image comprises the same array of pixels as that of the initial image but the red and blue values of the pixels are not taken into account so that only the green value remains associated with each pixel. The blue image is generated by taking into account only the blue value of the pixels of the initial image, i.e. the blue image comprises the same array of pixels as that of the initial image but the green and red values of the pixels are not taken into account so that only the blue value remains associated with each pixel.

As a result, in this example, the output of step 14 consists in the three RBG component images, i.e. the red image of the eye of the user, the green image of the eye and the blue image of the eye.

It should be appreciated that the same extraction or decomposition process could also be applied to other color spaces, such as YCbCr, HSV or HSL for example. However, since the RGB color space is typically the color space in which colors are captured by digital cameras and stored in a computer, the RGB space may be preferred. The use of other color spaces would indeed require an additional processing step to transform the RGB value into the chosen color space. The method is applicable for images collected using color components, such as RGB or other substantially equivalent color components, as described herein. However, the method could be applied under light conditions that would include light components which are not visible, for example using infrared images. Even though the method described herein does not require infrared projectors and cameras, the method can be applied to images comprising a component outside the visible spectrum. It should however be noted that in infrared light conditions, the difference between sclera and iris is very hard to identify as both appear grey in the images, and using infrared is therefore not particularly advantageous.

At step 16, the respective gaze position for each of the at least one component image is determined. It should be understood that any adequate method or algorithm for determining the gaze position may be used, as detailed below. As a result, in the example using the three RGB component images, a first gaze position is determined for the red component image, a second gaze position is determined for the green component image and a third gaze position is determined for the blue component image. In the embodiment in which a single component image is used, a single gaze position will be determined at this step 16. Instead of a respective gaze position, the component image may instead be treated individually by a respective primary stream (such as a respective portion of a larger neural network having convolutional layers) which is used to obtain a respective internal representation. An internal representation is the output, within a neural network, of a given layer of the neural network which is not the output layer.

At step 18, an estimated gaze position in the initial image is determined according to the respective gaze position of each of the at least one component image. In the embodiment in which a single component image is used, the estimated gaze position corresponds to the single respective gaze position determined at step 16.

In the embodiment in which at least two color components are extracted from the initial image, the determined at least two respective gaze positions are combined together using weight factors to obtain the estimated gaze position, using any adequate combination method, as described below. In the example using an RGB image, three respective gaze positions are combined together using weight factors to obtain the estimated gaze position.

The thus-obtained estimated gaze position is then outputted at step 20. For example, the estimated gaze position may be stored in memory for further processing.

It should be understood that the initial image may comprise the representation of a single eye or both eyes. It should also be understood that the initial image may comprise two images, i.e. a first image comprising a representation of a first eye and a second image comprising a representation of a second eye.

In an embodiment in which the initial image comprises at least one additional facial feature in addition to the eyes, the method 10 further comprises a step of cropping the initial image to generate a cropped image having a reduced size with respect to the size of the initial image and comprising a representation of the one or two eyes only (for example, two cropped eye areas, forming a composite image by being joined together, thus effectively removing the upper area of the nose). In order to crop the initial image, the eyes are previously identified within the initial image and extracted. It should be understood that any adequate facial feature recognition method may be used for identifying the eyes within the initial image. For example, this may be done by identifying the outline of the eyes, determining the position of the limbus (i.e., the sclera-iris boundary), and/or the iris and pupil of each eye, within the initial image, as known in the art. It should be understood that any adequate method for identifying eyes within an image may be used.

Once the eyes have been identified within the initial image, the portion of the image that comprises only the eyes is extracted from the initial image to create the cropped image. It should be understood that the size of the cropped image may vary so that the cropped image may comprise more than the eyes for example, while still having a size that is less than that of the initial image.

In one embodiment, the Constrained Local Model (CLM) method is used for identifying the eyes within the initial image. This method uses a number of expert detectors each trained to recognize a specific facial feature such as the inside corner of the right eye or the bridge of the nose. Given the image of a face, each of these experts will produce an estimation of the location of the feature they were trained to detect. Appropriate locations are then connected to produce an outline of the anatomical features of the face. Commonly detected features include: the eyes, the eyebrows, the bridge of the nose, the lips and the jaw. The ears are also sometimes detected. By using the position of different points relative to one another, a three-dimensional model of the face can be constructed.

In one embodiment, the cropping of the initial image for isolating the region of interest, i.e. the eyes, allows improving the signal-to-noise ratio of the data fed to the eye tracking algorithm (feature extraction), as well as decreasing the computational load (dimensionality reduction) and reducing the memory requirements for storing data.

In one embodiment, the extraction of the eyes from the initial image allows greatly reducing the input space to only contain relevant, non-redundant information.

As an example, assuming ideal western male facial proportions, and that the user's face is perfectly inscribed within the frame, the eyes will together represent about 40% of the horizontal space and about 7% of the vertical space of the initial image. This means that the images of both eyes together represent about 2.8% of the pixels of the initial image. The benefits are even greater if the user's face is smaller than the frame of the image. This allows reducing the demands for storage and the computational complexity of the below described regression problem, as further detailed below.

In a further embodiment, at least one additional facial landmark is extracted from the initial image in order to determine the head pose or attitude of the user in this image. In this embodiment, the at least one additional landmark is combined with the respective gaze positions to determine the estimated gaze position. As it will become apparent below, such an embodiment enables to make the method more invariant to head pose.

Head pose is defined as the position of the head relative to the camera. This includes translation and rotation. As measured from an initial image taken from a camera, translation would be measured of the distance between the center of the face and the center of the initial image. Rotation could be expressed in a number of ways, the most intuitive of which, for a human, would be the Euler angles of the head, pitch (head nod), yaw (head shake) and roll (head tilt).

As previously mentioned, modern Infra-Red gaze tracking methods and systems typically make use of a controlled source of light to estimate the rotation of the eyeballs relative to the head, to then produce an estimate of gaze position. Such a system can thus be said to be intrinsically invariant to head pose.

On the contrary, the above described method of FIG. 1 does not make any direct measurement of relative eye rotation, and so cannot be said to be head pose invariant. As previously mentioned, it is expected that the most relevant feature for estimating gaze position is the position of the limbus, or the boundary between the sclera and the iris, and the outline of the eye. This changes when the head is fixed and the position of the gaze changes, but also changes when the gaze is fixed and the position of the head changes, either through translation or through rotation.

Thus, in one embodiment, in order to produce more accurate gaze position estimates, some information about head pose are added to the input data of the method. As all features must be extracted from an image of the user's face, the obvious candidate feature set for this is a set of facial landmarks whose positions relative to each other change as the head moves and rotates. From these features, head translation can be easily determined, for example by taking the distance between a fixed point on the image and a specific facial landmark, or between a fixed point on the image and the centroid of a set of facial landmarks.

The Euler angles of the head are much harder to estimate and require the projections of the 2D coordinates of the facial landmarks onto a 3D model of the user's face. Assuming that the model used is a perfect model of the user's face, the uncertainty on the angles would be the same as the uncertainty on the positions of the facial landmarks. Given that the present method is meant to be deployed for use by the general public, such an assumption cannot be made and a few models of the human face need to be used instead, leading to an added uncertainty on the Euler angles.

In the context of training a machine learning algorithm, an ideal feature set should contain all the information necessary to solve the problem, and only the information necessary to solve the problem. By transforming the coordinates of the facial landmarks into Euler angles, information about the topology of the face model is added to the feature, which is relatively invariant through the dataset, while degrading the quality of the feature by increasing their uncertainty. For these reasons, the coordinates in image space of a set of facial landmarks have been chosen to use as a feature to introduce head pose invariance into our method.

It should be noted that such features already appear naturally in the eye images. Indeed, as the head moves and turns relative to the camera, the apparent height and width of the eyes also changes. However, under natural viewing conditions, the angle of the head relative to the camera will hardly ever be greater than 30 degrees, at which point viewing becomes uncomfortable. This means the apparent width and height of the eyes will nearly never vary by more than 15% of their maximum. Given the uncertainty in these measurements, this is unlikely to yield strong head pose invariance.

Figure 2:
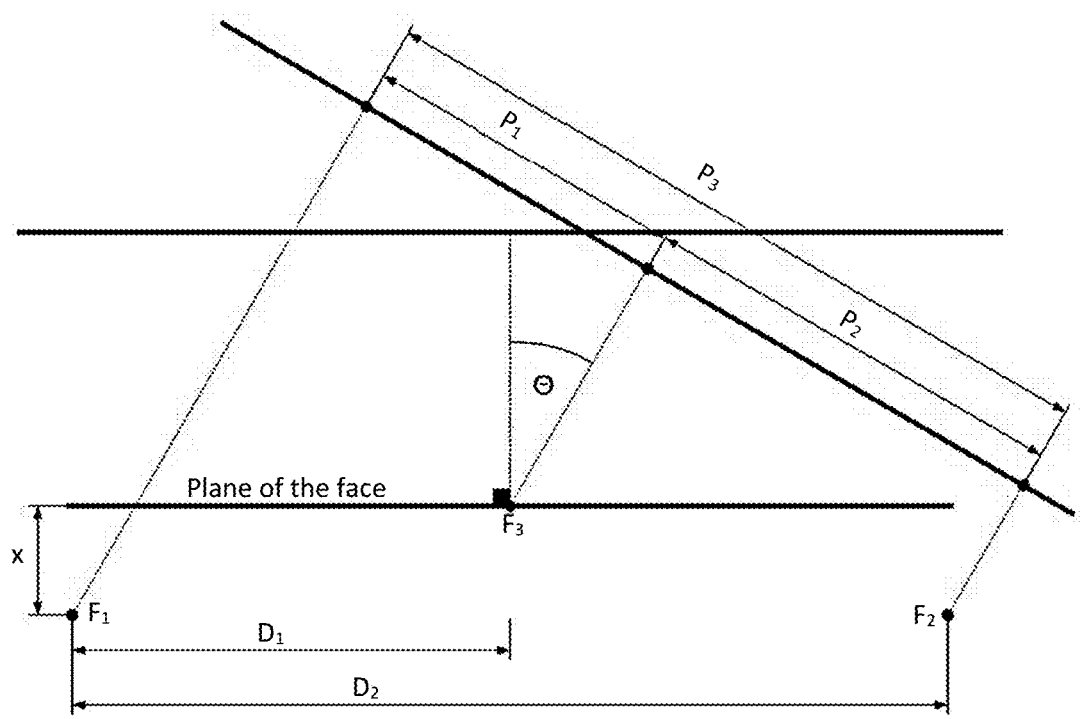
FIG. 2 shows the effects of head rotation on the projections of facial landmarks, according to one embodiment.

To better estimate head pose, in one embodiment, the XY coordinates of certain facial landmarks are used instead, provided that these landmarks do not lie in the same plane in 3D space. This effect is illustrated in FIG. 2. Here, $F_1$, $F_2$ and $F_3$ could represent the positions of the left eye, right eye and nasion, respectively, as seen from the top (the nasion being defined as the most anterior point of the frontonasal suture that joins the nasal part of the frontal bone and the nasal bones, visible on the face as a depressed area directly between the eyes, just superior to the bridge of the nose). Two features could be chosen here: $P_3$, the length of the projection of the distance between the eyes on the viewing surface, or $P_1$-$P_2$, the difference between the lengths of the projections of the distance between the left eye and the nasion, and the right eye and the nasion. The relationships between the values of those features and the angle of the head $\Theta$ is given by equations 1 and 2.

$$P_3 = 2D_1 \cos(\Theta) \quad (1)$$

$$P_1 - P_2 = \sqrt{(H^2 + D_1^2)} * (\cos(\Theta - \arctan(H_{D1})) - \cos(\Theta + \arctan(HD_1))) \quad (2)$$

One immediate advantage of using $P_1$-$P_2$ over $P_3$ is that the former preserves information about the direction of rotation. Indeed, the value of $P_3$ will always be positive for natural head angles, while $P_1$-$P_2$ will be positive in one direction and negative in the other. Additionally, an important aspect of a good feature is the difference in magnitude between extremes of the features. In other terms, a good feature should maximize the difference between its minimum values and its maximum value. In this example, this will be the case if $D_1$<H, H being the distance between the nasion and the eyes perpendicularly to the plane of the face and $D_1$ being the distance between the nasion and an eye in the plane of the face. In this example, the user's face is considered to be symmetrical, so $D_2 = 2D_1$. As it should now be apparent, a proper choice of facial landmarks can thus ensure these properties, making a choice of features that do not lie in a 2D plane much more interesting for head pose invariance.

Another advantage of using facial landmark coordinates over Euler angles is that the facial landmark coordinates contain information about the distance between the face and the camera, while the Euler angles do not.

Finally, it should be noted that depending on the chosen algorithm and architecture for performing the method, this information is not strictly required for the model to perform well. However, if it is omitted, performance is expected to degrade quickly if the user moves his head away from the typical position it was in during calibration, as it will be detailed thereinafter.

Figure 3:
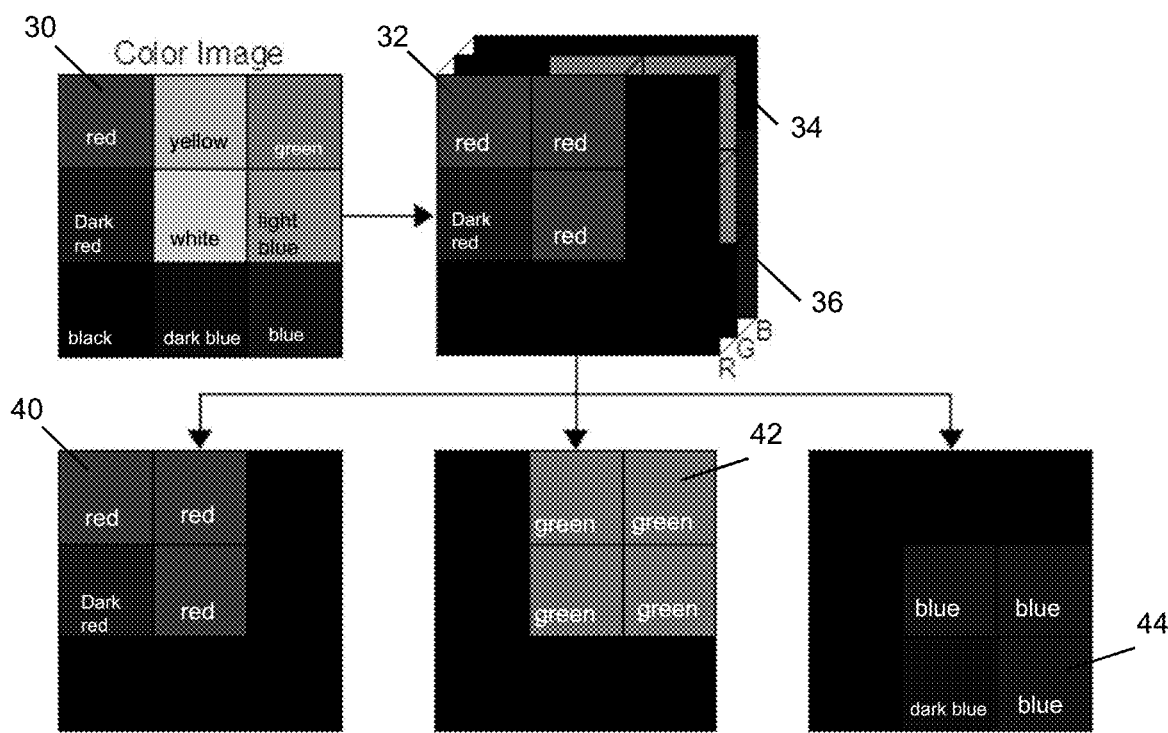
FIG. 3 illustrates the decomposition of an image comprising 9 pixels into three component RGB images, according to one embodiment.

FIG. 3 illustrates an exemplary decomposition of a color image 30 into its RGB components. It should be understood that the image 30 may be the original initial image or the cropped image as long as it contains the eyes.

The image 30 comprises nine pixels each having a different color. Each pixel has a red value, a green value and a blue value associated thereto, thereby forming the RGB components 32, 34 and 36 of the image 30. The red component 32 comprises only the red value for the nine pixels of the image 30. The green component 34 comprises only the green value for the nine pixels of the image 30. The blue component 36 comprises only the blue value for the nine pixels of the image 30. The RBG components are then isolated to create a red image 40 which includes the nine pixels to which only the red value is associated thereto, a green image 42 which includes the nine pixels to which only the green value is associated thereto, and a blue image 44 which includes the nine pixels to which only the blue value is associated thereto.

It should be understood that each RGB component image corresponds to a greyscale image. Indeed, as the single-color image is a two-dimensional matrix such as a greyscale color image, the new single color image, i.e. the RGB component image, corresponds to a greyscale image, despite representing a color channel. Thus, the greyscaling of the color components is simply a result of the decomposition.

It should be understood that in typical computer vision applications, images are normally fed as M×N×3 tridimensional matrices, comprising 3 layers, each corresponding to one of the RGB components of the image. This matrix would typically be fed to the first layer of the network and treated altogether in bulk (i.e., with the three layers, and using a kernel or filter having the same depth), and the information related to each of the RGB components will be "lost" in the following layers of the network where all data are mixed into the subsequent layers. In such a case, it would not be possible to identify, at an internal representation of the network, information specifically related to one color component only, as everything is already mixed starting at the first layer of the network being applied to the three-dimensional matrix.

Instead, in the present invention, the M×N×3 matrix is split in three different two-dimensional matrices of M×N size (or M×N×1), and each one is treated individually by its own portion of neural network (i.e., their own distinct primary stream) before being fused after a few layers of their own distinct primary stream. For example, each of the three M×N×1 matrices is fed to its own individual and distinct primary stream (portion of the neural network), which would comprise more than one layer. For example, these individual and distinct primary streams for each of the color component images could comprise 2 or 3 convolutional layers and 2 or 3 fully-connected layers, before fusion. This ensures that information that can be found in a single color-component image is well analyzed individually. The individual and distinct output of the respective primary stream for each color component image should not be confused with the whole network's output (which can be trained), and it is rather called an internal representation of the network at that layer (to be fused in a step called feature fusion for further processing downstream).

Figure 4:
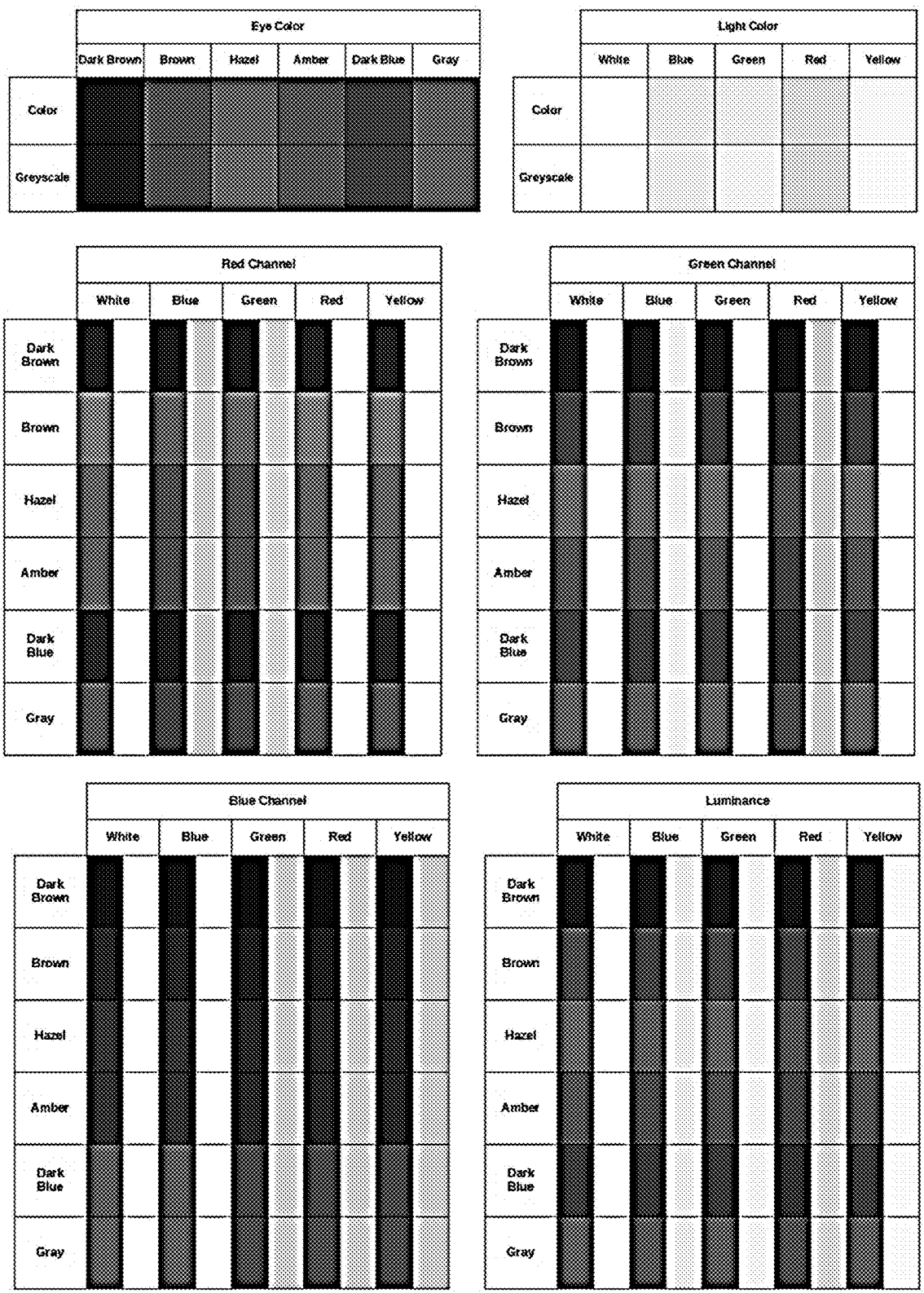
FIG. 4 shows an example of contrast between eye colors and sclera in individual color channels of an RGB image, and between their grayscale equivalents, according to one embodiment.

Making sure that the individual color component images are treated according to their own, distinct primary stream has its advantages. Indeed, we have found empirically that depending on the circumstance, one of the color components (for example, in an RGB color space, one of R, G or B) can be more appropriate or useful than the others. This can improve accuracy, as described below. After applying in parallel the distinct primary streams, all resulting internal representations from the three color component images (or more generally, from the at least one color component image), are fused with the illumination information and facial landmarks (or an internal representation thereof following an auxiliary stream). The conditions in which one of the color component images is more appropriate empirically depend on the illumination information in the environment. There is no single color component which is more adapted than another in every circumstance. Therefore, the neural networks adapt to the illumination context by performing a fusion between each color-component image (at the end of their own individual and distinct primary stream) and with the illumination information (which can also undergo an auxiliary stream). By doing this, the neural network automatically adapts to the real illumination context and uses the most useful color component in this particular circumstance by performing additional operations through subsequent layers of the network, i.e., the internal stream, which is the portion of the neural network downstream of the fusion layer. In one embodiment, the most relevant feature for eye tracking in ambient light may be the position of the sclera-iris boundary, or limbus, relative to the outline of the eye. Thus, a better contrast between the sclera and the iris would allow for a better definition of this boundary and thus a more robust eye tracking method or algorithm. Different eye colors reflect different amounts of red, green and blue light. For this reason, one can expect that the identification of the limbus may depend on the user's eye color and the ambient lighting conditions, and for the reasons described above, the neural network is trained to identify and use an internal representation originating from a specific color component image (or a plurality thereof), for which the edges between sclera and iris, and between sclera and outline of the eye are more easily identified under specific illuminant values, to be fed into the systems and combined with the internal representation of the component images at the fusion layer. By decomposing the image into its RGB components, at least one of the resulting images may have a better contrast between the sclera and the iris. Thus, depending on the user's eye color and the temperature of the ambient light, one of the three RGB component images should provide the best contrast of the limbus. Moreover, we hypothesize that one of the color channels will always have higher contrast than in the equivalent greyscale image. This is illustrated in FIG. 4, in which the contrasts between different eye colors under various lighting conditions, for each of the RGB color channels and for the equivalent grayscale values, are illustrated. It is worth mentioning that, for each eye color and lighting combination, the greatest contrast between all the color channels is always greater than in the grayscale case.

The task of selecting which channel to prioritize is not a trivial one, as there exists infinite combinations of ambient lighting conditions and eye color. In one embodiment, a regression algorithm is used. While the color images could have been converted to grayscale, or the color channels concatenated to each other to be processed in the same pipeline, this would not have allowed the leveraging of these differences between color channels. For this reason, the three color channels are processed separately, and then fused at the decision or feature level, eventually using additional previously computed data such as illuminant values, as described below.

While it is considered that having separate streams to process each color channels separately is beneficial to the performance of the model/algorithm, it is not necessary to include all three color channels. Indeed, considering that the fusion of the single-channel streams is done through a weighted sum of each stream, which, while being an over-simplification in the case of deep-learning models, is not inaccurate, the omission of one or more color channels would amount to setting the weights applied to these channels in the weighted sum to zero. A model that only uses two channels or a single channel, or indeed a grayscale rendition of the color image, can be seen as a special case in which one or two processing streams are essentially ignored.

In one embodiment, as previously mentioned, the determination of the respective gaze position for the three component images is performed using a regression algorithm/method. For example, linear regression, ordinary least squares, decision tree regression and/or artificial neural networks may be used.

In a further embodiment, the determination of the estimated gaze position is also performed using a regression method or algorithm. For example, linear regression, ordinary least squares, decision tree regression and/or artificial neural networks may be used.

Regression algorithms usually follow a same training procedure. For the purpose of the present description, the inputs are named X, the estimates are named $\hat{Y}$ and the targets are named Y. In the present case, X would be the initial image of the user's eyes, $\hat{Y}$ would be the estimate of the position of the user's gaze produced by the regression method, and Y would be the actual position of the user's gaze.

The training procedure creates a model F(X) that approximates a mathematical relationship between X and Y, and that yields $\hat{Y}$ from X. In other words, $Y \approx \hat{Y} = F(X)$. The goal of the training procedure is to adjust this mathematical relationship in a way to minimize the error between Y and $\hat{Y}$ for any given X.

In the case of linear regression, F(X) may be expressed as:

$$F(X)=B+\Sigma Wj*Xj \quad (3)$$

where Xj is the jth feature of the input vector X, Wj is the weight associated to that feature, and B is the Y-intercept, or bias, of the linear regression model. In this case, the goal of the training procedure would be to adjust the weights and the bias so as to minimize the prediction error.

In one embodiment, regression algorithms also have hyperparameters, which affect the training procedure and therefore the final model, which also have to be optimized. In the present example of linear regression, the hyperparameter would tell whether or not to include a bias term in the equation.

Hyperparameter optimization involves splitting the dataset into two parts, the training set and the validation set. Prior to training, a hyperparameter search space is defined, which bounds the possible values of hyperparameters to be explored. For each set of values, the training procedure described above is completed, and the performance of the trained model is obtained from the validation set. The set of hyperparameter values that yielded that best performance will finally be retained as the final model.

As described at step 18 of the method 10, the respective gaze positions determined for the three RGB component images are combined together to provide an estimated gaze position. It should be understood that different combination methods may be used.

In one embodiment, the estimated gaze position corresponds to a weighted average of the respective gaze positions determined for the three RGB component images:

$$\hat{Y}f = \Sigma Wc * \hat{Y}c \quad (4)$$

where Wc is the weight factor associated with each RBG component c.

In one embodiment, the weight factors are determined using a measure of how much each color channel contributes to the color image.

For example, the weight factors may be determined by calculating the relative contribution of each color channel by summing the values of every pixel of a color channel, and dividing the result by the sum of all the pixels in the image. In one embodiment, such a method for calculating the weight factors is simple, fast to compute and fairly invariant to light intensity. Indeed, lowering or increasing the intensity of ambient lighting would lower or increase the value of every pixel in every channel by a same factor, up to the point a pixel starts saturating. In one embodiment, the three values representing the relative contribution of each color channel correspond to the weight factors Wc.

In another embodiment, a further regression algorithm may be used for combining the three respective gaze positions obtained for the three RGB component images. The inputs of the further regression algorithm could be the three values representing the relative contribution of each color channel and the three gaze positions obtained for the three RGB component images, which would through training approximate the relationship between ambient light and color channel contribution.

As previously mentioned, in an improved gaze position estimation, the combination of the three respective gaze positions obtained for the three RGB component images could further been done as a function of the illuminant values representative of the relative contribution of each color channel of the initial image.

In one embodiment, the illuminant values may be determining using the method proposed in Yang, K. F., Gao, S. B., & Li, Y. J. (2015); Efficient illuminant estimation for color constancy using grey pixels; In *Proceedings of the IEEE Conference on Computer Vision and Pattern Recognition* (pp. 2254-2263), but other methods may be used. For example, it may be considered to calculate the relative contribution of each color channel by summing the values of every pixel of a color channel, and dividing the result by the sum of all the pixels in the image, as previously explained.

Other methods such as Gamut Constrained Illuminant Estimation and Grey Pixel Illuminant-Invariant Measure may also be used, as it should be apparent to the skilled addressee.

Once the illuminant values have been determined, they are combined with the respective gaze positions to determine an estimation of the gaze position in the initial image.

Figure 5:
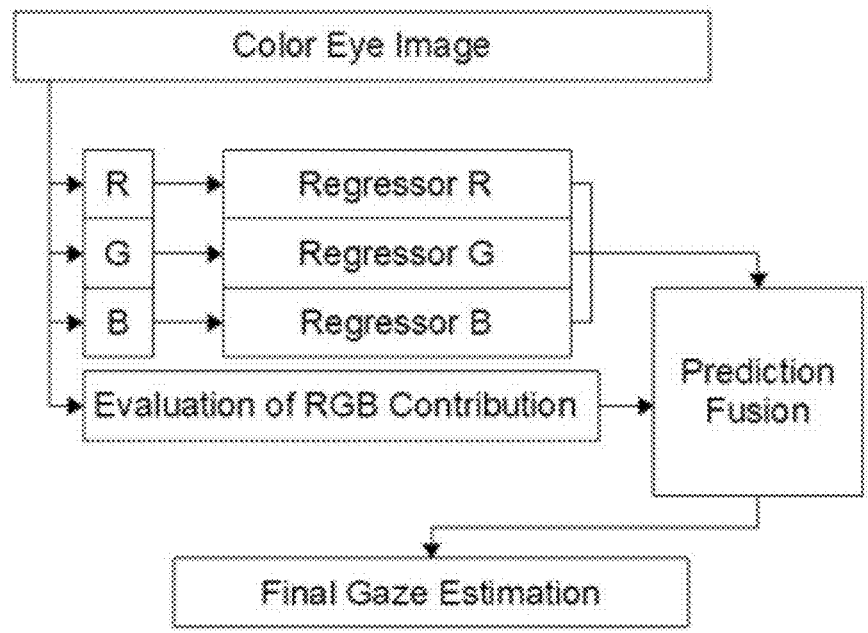
FIG. 5 is a schematic block diagram illustrating a regression algorithm used for implementing the method shown in FIG. 1, according to one embodiment.

FIG. 5 shows a regression algorithm used for implementing the method 10 shown in FIG. 1, according to one embodiment. Three regressors are trained as single channel regressors, each on a different color channel of the full color image of the user's eye. Their decisions are then combined by a fourth regressor, also called prediction fusion, taking as an input the predictions from all three channels and the relative contribution of each color channel to the image.

In this embodiment, four regression algorithms were tested as single-channel regressors, that were deemed appropriate considering the following parameters: small size of the initial dataset, low memory requirements and relatively low training time. These algorithms were: Ridge Regression, a Support Vector Machine (SVM), an Extremely Randomized Trees (ETR) and ElasticNet.

The image database used for training is collected from volunteers who were asked to look at 13 predefined crosses on a computer screen. Each cross appeared one after the other and stayed in view for three seconds. Subjects were given the first second to find the target. During the next two seconds, ten images of the subject's face and surroundings were captured using a camera, to obtain images similar to those obtained from a mobile device's front facing camera. Then, the target disappeared and the next target appeared. Ten images were captured for every cross to provide usable data in the event of a blink.

To build the dataset used for training, the images containing the subject's right and left eyes were cropped from the initial image using a facial feature recognition algorithm to determine the location of the eyes and eyebrows in the initial image. This information was used to define the bounding boxes for each eye, which were then used to crop the eyes. These two eye images were then associated with an (X, Y) set of coordinates representing the location of the center of the cross on the screen at the time of image acquisition.

Figure 6:
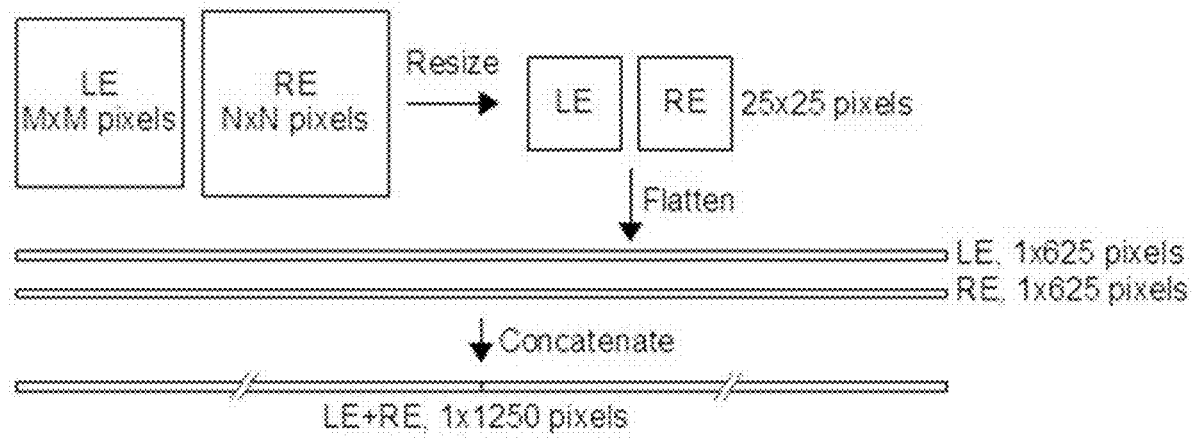
FIG. 6 illustrates the resizing, flattening and concatenation of two images, in accordance with an embodiment.

Referring now to FIG. 6, as the algorithms used in this embodiment only accept one-dimensional matrices (i.e., vectors) of a fixed size as inputs, the eye images need to be resized and flattened before they could be used. The resizing was necessary because there was no guarantee that the cropped eye images would be the same size from frame to frame, or even as each other. Square crops were used to simplify the process, and both images were resized to be 25×25 pixels. This size was chosen empirically, as a compromise between an acceptable loss of resolution and an increased size. The images are then flattened to make them one pixel high, while preserving the total number of pixels.

Finally, the images are concatenated to produce a single image with double the number of pixels Finally, the images are concatenated to produce a single image with double the number of pixels. This image is the input to a single-color regressor.

Figure 7:
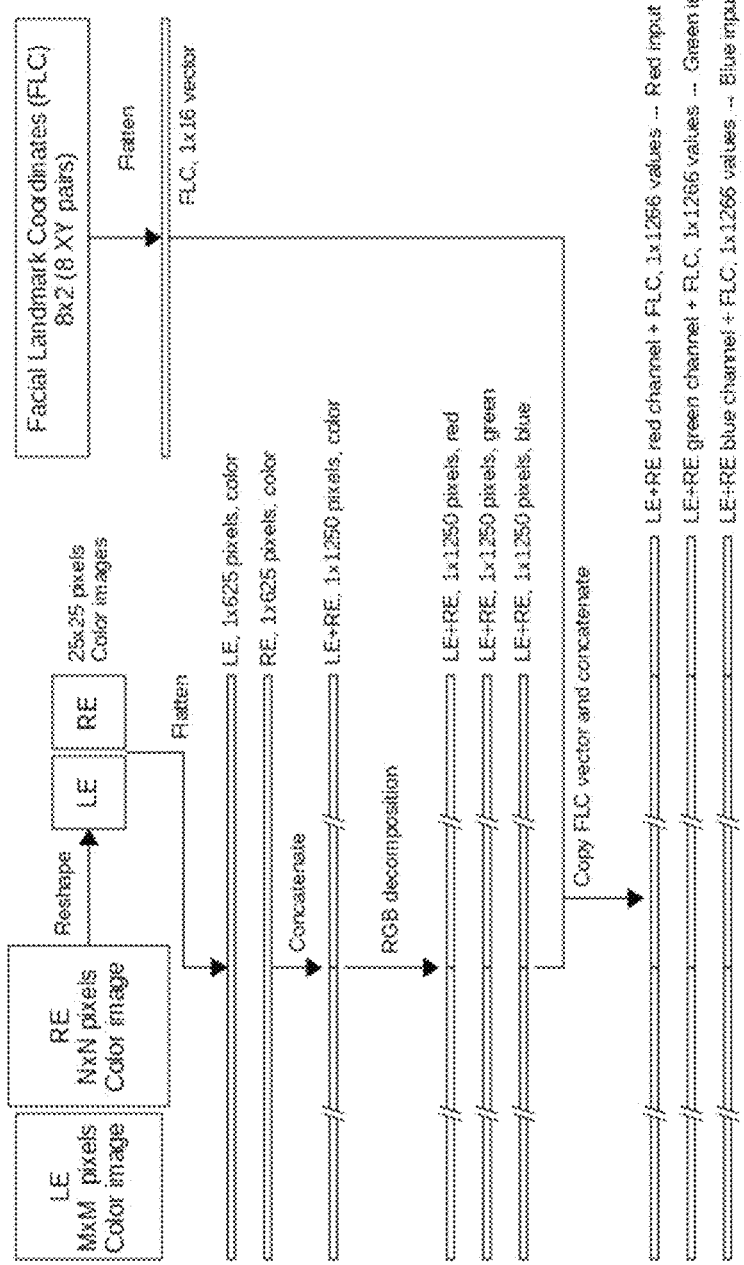
FIG. 7 illustrates the resizing, flattening and concatenation of two images, in accordance with another embodiment.

While the reshaped, concatenated and flattened eye images would be sufficient to train an eye tracking system, the system would be very sensitive to head movements. To obviate this issue, a vector of (X, Y) facial landmark coordinates may also be concatenated to the eye vectors to form the inputs to the algorithms, according to one embodiment and as illustrated in FIG. 7. In one embodiment, the XY coordinates of eight facial landmarks are retrieved using a third-party facial landmark detection algorithm. These coordinates are flattened into a vector of 16 values. After the processing steps described in FIG. 6, the eye vectors are separated into individual color channels. Each of these vectors is then concatenated with a copy of the facial landmark vector. The resulting three vectors are finally used as the inputs to the single-channel regression algorithms.

Before training, a search space of possible hyperparameter values was defined for every algorithm under consideration. Models were then trained and tested for each channel, for each algorithm and for each set of relevant hyperparameters. The performance metrics used to evaluate the performance of a model were the Mean Absolute Error (MAE) and the coefficient of determination R2.

The MAE is the average distance between an estimate and the target value. In this case, as the estimates and targets were sets of two-dimensional coordinates, the Euclidean distance was the distance metric.

The R2 is an indicator of how well future values are likely to be predicted by the model. Values typically range from 0 to 1. A value of 1 represents a model with perfect predictive power, that will yield the target value for any possible input value. A value of 0 represents a constant model that always outputs the same value, regardless of the input value. As a model can be arbitrarily bad, values can range into the negatives.

For each color channel, the model that had achieved the highest R2 was kept as the final model. The hyperparameters used to train this model were saved for future use.

In one embodiment, the architecture that was settled on for the single-channel regressors was a combination of a Ridge Regressor and an SVM, whose outputs were averaged. Testing shown that these two algorithms made complimentary mistakes of the same magnitude. That is, if one overestimated the gaze position by a certain amount, the other underestimated the gaze position by substantially the same amount. By averaging their predictions, their mistakes were averaged, thus making the model more accurate.

For prediction fusion, i.e. the determination of the estimated gaze position based on the respective gaze positions, all the aforementioned regression algorithms were tested in addition to linear regression. Linear regression was added as a candidate due to the very low dimensionality of the input space for this regressor. Indeed, the input was comprised of the two-dimensional outputs of all three single-color regressors, as well as the relative contribution of all three color channels, for a total of 9 dimensions.

Following the same approach as the single-color regressors for model exploration and hyperparameter optimization, the linear regression algorithm was settled to perform color correction, as there was no significant gain from using a more complex regression algorithm. Thus, the method used for combination was the above-described method described in Equation 5, where G is the final gaze estimate, We are weights, $I_c$ is the illuminant value for a specific color channel, and $G_c$ is the gaze estimate for a specific color channel.

$$G = B + \sum_{c \in [R,G,B]} W_c * I_c + \sum_{c \in [R,G,B]} W_c * G_c \tag{5}$$

The means by which the weight factors We were determined was by computing the relative contribution of each color channel, that is the sum of the intensity of each pixel for a given channel divided by the sum of the intensity of each pixel for each channel, as previously described.

These initial algorithms, although very quick to train, are not capable of incremental learning, which severely limits the size of the dataset the models it is trained on, and so its ability to generalize. Tests have shown that the application required constant calibrations and the knowledge gained by calibrating with one user could not feasibly be extended to a large set of users. For these reasons, machine learning algorithms capable of incremental learning may be preferred for a given application, specifically Artificial Neural Networks, as Convolutional Neural Networks seemed particularly well-suited to this problem, as described in details below with reference to FIGS. 15 to 20.

In one embodiment, the above-described method 10 may be embodied as a computer program product comprising a computer readable memory storing computer executable instructions thereon that when executed by a computer perform the steps of the method 10.

In one embodiment, the above-described method 10 may be embodied as a system comprising a communication unit for at least one of receiving and transmitting data, a memory and at least one processing unit configured for executing the steps of the method 10.

Figure 8:
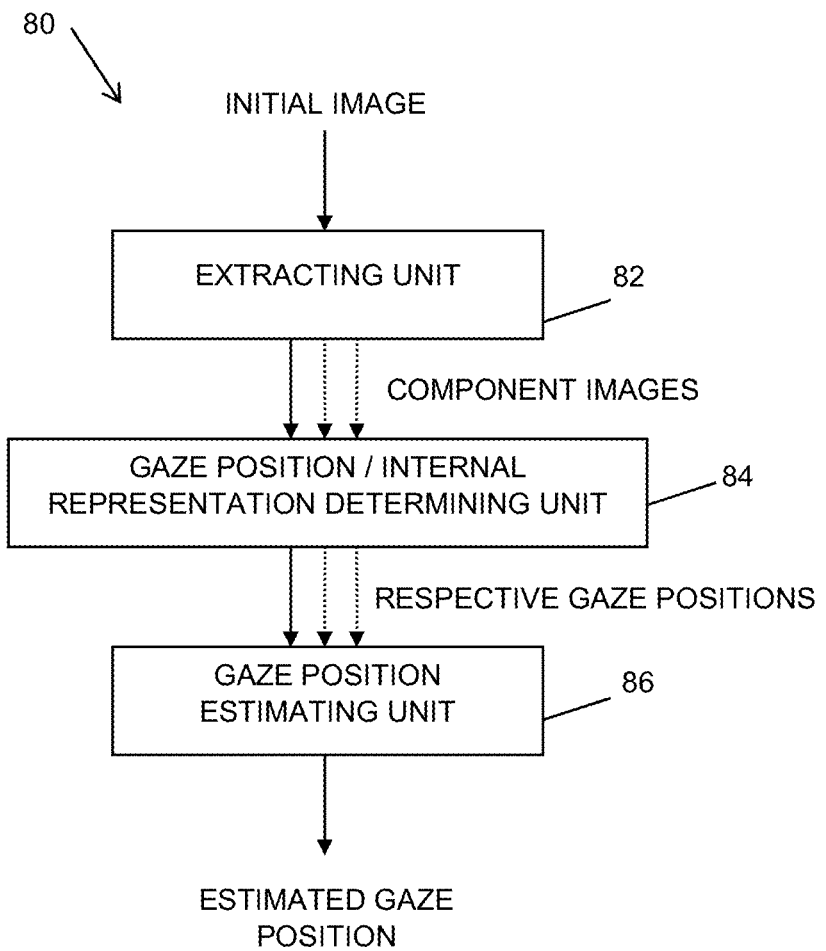
FIG. 8 is a schematic block diagram illustrating a system for determining a gaze position, in accordance with one embodiment.

Referring now to FIG. 8, a system 80 for determining a gaze position of a user in an initial image will now be described, according to one embodiment. The system 80 is provided with an extracting unit 82, a gaze position determining unit 84 and a gaze position estimating unit 86.

The extracting unit 82 is configured for receiving an initial image of at least one eye of the user and extracting at least one color component of the initial image to obtain a corresponding at least one component image, as detailed above. In one embodiment, the extracting unit 82 is configured for extracting at least two distinct color components of the initial image to obtain at least two corresponding component images. In a further embodiment, the extracting 82 unit is configured for extracting three distinct color components of the initial image to obtain three corresponding component images. In one embodiment, the extracting unit 82 is configured for extracting each of three RGB components of the initial image, as previously described. In a further embodiment, the extracting unit 82 may be further configured for cropping the initial image, as described above.

The gaze position determining unit 84 is configured for receiving each of the component images from the extracting unit 82 and determining a respective gaze position for each one of the component images, as described above.

The gaze position estimating unit 86 is configured for determining an estimated gaze position in the initial image according to the respective gaze position of each of the at least one component image and outputting the estimated gaze position. In the case where two or three component images are extracted, the gaze position estimating unit 86 is configured for combining each of the respective gaze positions together, for example using weight factors, as previously detailed.

In one embodiment, the received initial image contains additional features other than the at least one eye, and the extracting unit 82 is further configured for identifying the at least one eye within the received initial image; extracting a portion of the initial image containing only the at least one eye to obtain a cropped image; and extracting the at least one color component of the cropped image to obtain the corresponding at least one component image, as previously described.

In an embodiment wherein illuminant values are used, the extracting unit 82 is further configured for, for each of the component images, determining an illuminant value representative of the relative contribution of the corresponding component image to the initial image, as previously described. In this case, the gaze position estimating unit 86 is further configured for combining the illuminant values with the respective gaze positions.

In an embodiment wherein head pose invariance is implemented, the received initial image further contains at least one facial landmark, as detailed above. The extracting unit 82 is further configured for extracting the at least one facial landmark to obtain a corresponding at least one landmark position. In this embodiment, the gaze position estimating unit 86 is further configured for combining the at least one landmark position with the respective gaze positions.

In one embodiment, each one of the units 82, 84 and 86 is provided with a respective processing unit such as a microprocessor, a respective memory and respective communication means. In another embodiment, at least two of the modules 82, 84 and 86 may share a same processing unit, a same memory and/or same communication means. For example, the system 80 may comprise a single processing unit used by each module 82, 84 and 86, a single memory and a single communication unit.

Figure 9:
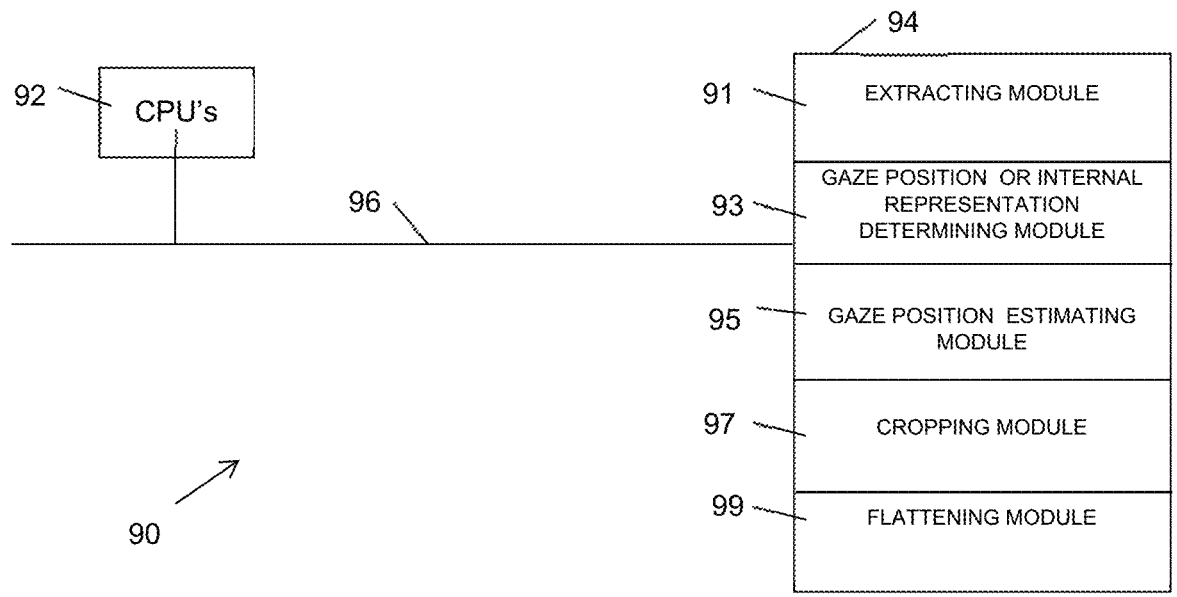
FIG. 9 is a block diagram illustrating a processing module adapted to execute at least some of the steps of the method of FIG. 1, in accordance with one embodiment.

FIG. 9 is a block diagram illustrating an exemplary processing module 90 for executing the steps 12 to 20 of the method 10, in accordance with some embodiments. The processing module 90 typically includes one or more Computer Processing Units (CPUs) and/or Graphic Processing Units (GPUs) 92 for executing modules or programs and/or instructions stored in memory 94 and thereby performing processing operations, memory 94, and one or more communication buses 96 for interconnecting these components. The communication buses 96 optionally include circuitry (sometimes called a chipset) that interconnects and controls communications between system components. The memory 94 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 94 optionally includes one or more storage devices remotely located from the CPU(s) 92. The memory 94, or alternately the non-volatile memory device(s) within the memory 94, comprises a non-transitory computer readable storage medium. In some embodiments, the memory 94, or the computer readable storage medium of the memory 94 stores the following programs, modules, and data structures, or a subset thereof:

An extraction module 91 for extracting at least one color component of the initial image to obtain a corresponding at least one component image;

a gaze position determining module 93 for determining the gaze position in the component images;

a gaze position estimating module 95 for determining an estimated gaze position in the initial image according to the respective gaze position of each of the at least one component image;

a cropping module 97 for cropping images; and a flattening module 99 for flattening images.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 94 may store a subset of the modules and data structures identified above. Furthermore, the memory 94 may store additional modules and data structures not described above.

Although it shows a processing module 90, FIG. 9 is intended more as a functional description of the various features which may be present in a management module than a structural schematic of the embodiments described herein. In practice, and as recognized by those of ordinary skill in the art, items shown separately could be combined and some items could be separated.

The following description will now describe the use of deep learning algorithms or models that may be used to improve the estimation of the gaze position in the initial image, as previously mentioned. The method using deep learning has similarities with the method described above; however, one notable difference is that the result of the first "primary" treatment of the distinct color component images is an "internal representation", which is generally not the same as a respective gaze output. The internal representation has already been mentioned above and is the output of a layer inside the neural network, to be fused with other internal representations. Normally, it has no concrete meaning as it is not a final network output which results from training and is not designed to be an estimation of any sort (it is merely the output of that layer).

However, the method not involving neural networks that was described above outputs the respective gaze output in an intermediate step, and this the respective gaze output such as the respective outputs of the Regressor R, G or B in FIG. 5, can be viewed as a specific case of the "internal representation" in which the internal representation happens to have a meaning, i.e., the respective gaze output, as it is the result from training and is designed to be an intermediate estimate.

Figure 10:
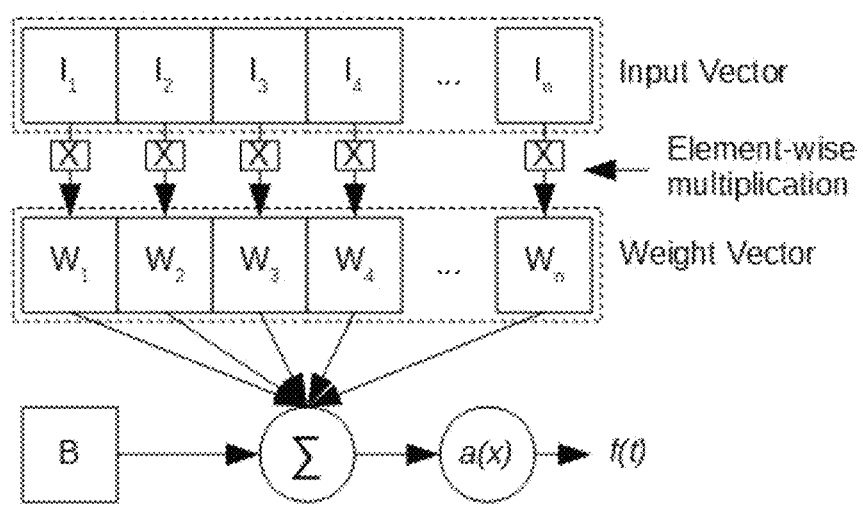
FIG. 10 illustrates the structure of an artificial neuron of a neural network.

Referring now to FIG. 10, there is shown the typical structure of an artificial neuron, the fundamental unit of Artificial Neural Networks, which can be arranged in several connected layers of neurons. The artificial neuron represents a mathematical operation applied to a weighted sum to produce an output. The artificial neuron has four main components. The neuron's input is a vector IN of numbers of size N. The neuron's weights are also a vector $W_N$ of size N, multiplying element-wise the input vector. The neuron can have a bias term B. Finally, the neuron has an activation function f(x) which determines its output, or activation a(t). The output of a neuron can thus be expressed as $a(t) = f(B + \Sigma Ii \cdot Wi)$.

Figure 11:
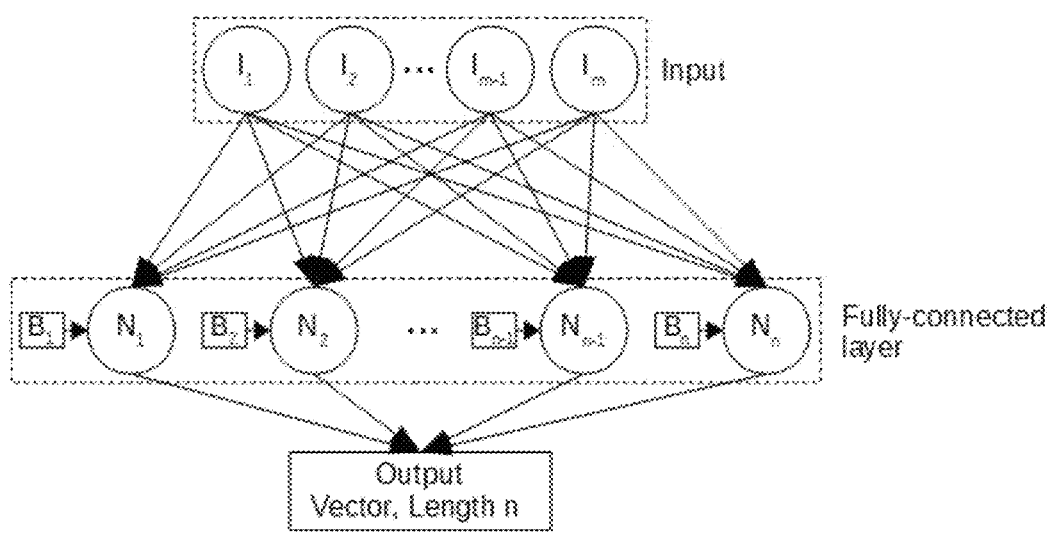
FIG. 11 illustrates the structure of a fully-connected layer of a neural network, according to one embodiment.

FIG. 11 illustrates the structure of a fully-connected layer of neurons, which is a layer of neurons whose neurons have as an input all the outputs of the previous layer. That is, each neuron of the layer accepts as an input vector the entire output vector of the previous layer. Given a fully connected layer of size N and an input vector I of size M, each neuron will have M inputs and so M weights, and so the layer has an M×N weight matrix W and a bias vector B of size N. To simplify computations, all the neurons are made to have the same activation function. The output of the layer is thus a vector given by the application of the activation function to each element of the vector obtained by the matrix operation I·W+B.

Figure 12:
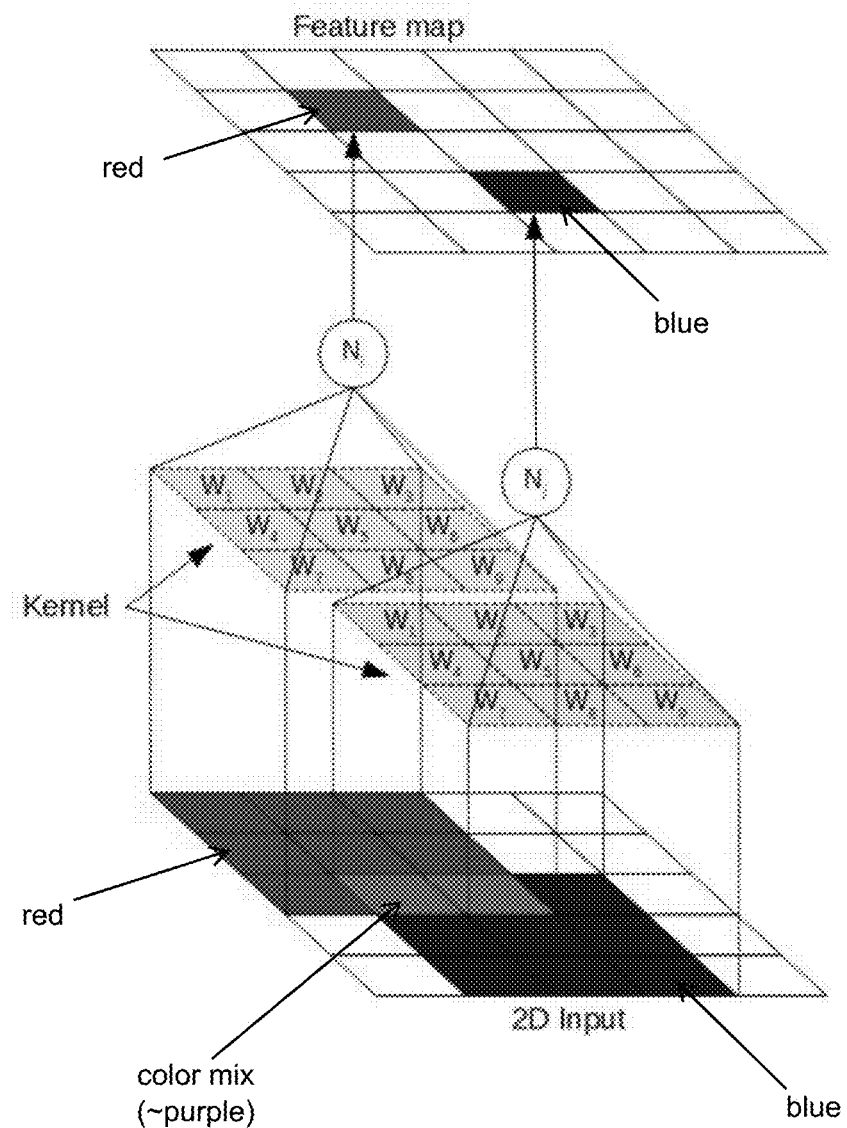
FIG. 12 illustrates the structure of a convolutional layer of a neural network, according to one embodiment.

FIG. 12 illustrates a structure of a convolutional layer of neurons, which is a layer that takes as an input a multi-dimensional matrix instead of a single-dimension vector. The layer is defined by its convolutional kernels instead of being defined by the number of neurons it contains, as a fully-connected layer would be. These layers were initially designed to be used on greyscale images, but their working principle can be extended to a higher dimensional input. For simplicity, we will refer to an element of the input as a pixel, but it needs only be an element of a matrix that may not be an image.

The workings of a convolutional layer are described here and illustrated in FIG. 12. For a given input of size H*W, a convolutional layer is said to have H*W neurons, each associated with a pixel. The layer is also given a set of M*N convolutional kernels, which are essentially a set of weights. However, unlike the fully-connected layer in which each neuron has its own set of weights, in a convolutional layer, all neurons share the same weight. Each neuron will have a receptive field on the input, of the same size as the convolutional kernels, with the neuron centered in the receptive field. In FIG. 12 for example, we use a single 3*3 kernel. The receptive fields of neurons $N_i$ and $N_j$ are shown.

The output of the layer is a set of feature maps, one for each kernel, of the same size as the input. Each pixel of a feature map is given by the application of the activation function to the sum of the pixel values multiplied by the appropriate weight of a kernel. The result of this operation is the same as convolving the kernel over the input, so filtering the input with the kernel, and applying the activation function to the result, hence the name "convolutional".

Figure 13:
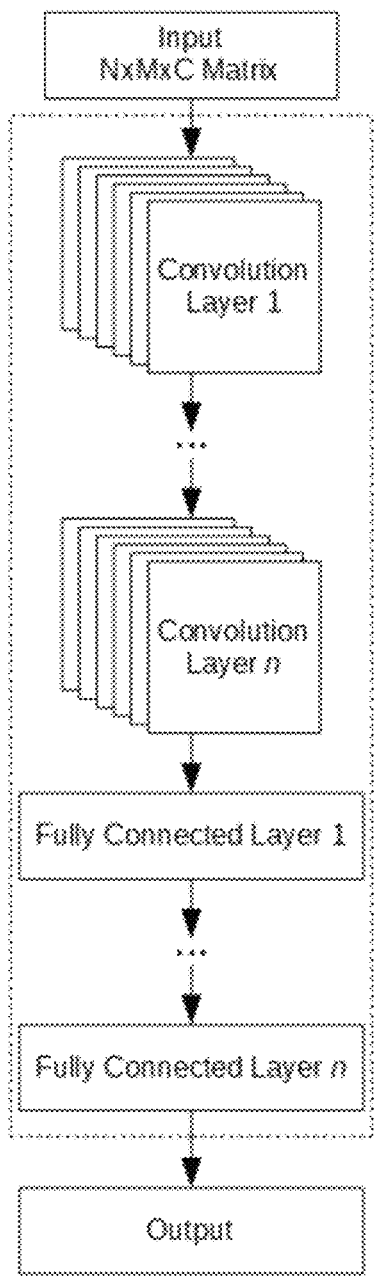
FIG. 13 illustrates the structure of a convolutional stream, according to one embodiment.

FIG. 13 illustrates a structure of a convolutional stream of a neural network using fully-connected layers of neurons that can be used to implement the method of the invention, according to one embodiment.

Primary convolutional streams are processing streams of neural network layers that can be used to process the individual color channels of the eye images. As they are convolutional, at least one convolutional layer is included in each stream but a plurality of streams is used in one embodiment. After a certain number of convolutional layers, a number of fully-connected layers may be added downstream, although not required. In fact, it is common practice to add fully-connected layers to a set of convolutional layers as this tends to improve the predictive power of the model. For example, and without limitation, the primary stream of a given color component image can include two or three convolutional layers, and two or three fully-connected layers, before arriving at the fusion layer downstream, which receives the internal representation from the respective primary stream for this given color component image. Batch normalization method can be used on the convolutional layers, while L2 regularization and Dropout regularization method can be used on the fully-connected layers. Other regularization methods or combinations thereof can also be applied to these convolutional layers. It has however been empirically determined that the above mentioned methods are well suited for the application. Additionally, max pooling can be used after each convolutional layer in order to reduce the dimensionality of the input to the next layer. Again, pooling is a widely used tool but is not required. Other pooling methods may also be used, such as average pooling. A pooling operation reduces a neighborhood of pixels to a single value by performing some operation on the neighborhood, such as averaging the values or taking the maximum value.

If the convolutional stream does not use fully-connected layers, the output of a convolutional stream is a set of feature maps, the number of which corresponds to the number of kernels in the last convolution layer. If one or more fully-connected layers are used, the output of a convolutional stream will be a vector containing the same number of elements as the number of neurons in the last fully-connected layer. Additionally, if one or more fully-connected layers are used, the output of the last convolutional layer must be flattened into a vector to be accepted as an input by the first fully-connected layer, as previously described with reference to FIGS. 6 and 7.

Figure 14:
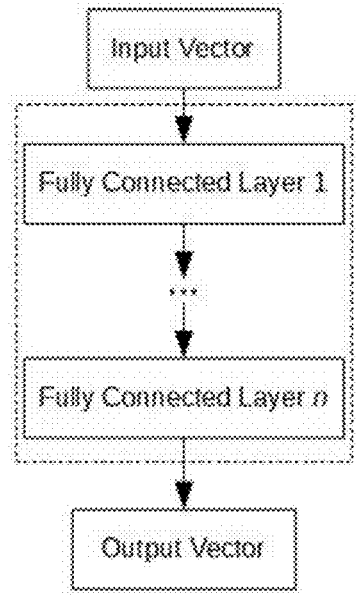
FIG. 14 illustrates the structure of a fully-connected stream, according to one embodiment.

FIG. 14 illustrates a structure of a fully-connected stream of a neural network that can be used to implement the method of the invention, according to another embodiment.

Primary fully-connected streams are streams of neural network layer that can be used to process the individual channels of the eye images. As they are composed exclusively of fully-connected layers, the eye images need to be flattened into vector form to be accepted as inputs by the first fully-connected layer of the stream, as previously detailed with reference to FIGS. 6 and 7. If no fully connected-layer is used, the output of such a stream is the vectorized input image. Such a case may be rare but may be useful in the case where the output of the stream is inputted into another stream for further processing. If one or more fully-connected layer is used, the output is a vector containing the same number of elements as the number of neurons in the last fully-connected layer.

In one embodiment, L2 regularization and Dropout regularization methods are used on the fully-connected layers but other regularization methods or combinations thereof can also be applied to these fully-connected layers.

In the case where auxiliary inputs are used, namely the illuminant values and the facial landmark coordinates for example, they can be fed directly to the fusion layer, or alternatively and advantageously, auxiliary input streams of neural network can be used to apply some processing to the auxiliary inputs. The fusion layer will then receive the internal representation originating from these auxiliary inputs (illuminant values and the facial landmark coordinates). Since these inputs are of low dimensionality, being of size 3 and 16 respectively in the previously described example, the layers used in these streams are fully-connected layers in one embodiment. If one or more fully-connected layers are used, the output of an auxiliary stream will be a vector containing as many elements as there are neurons in the last fully-connected layer. If no fully-connected layer is used, the output of an auxiliary stream is its input. In one embodiment, L2 regularization and Dropout regularization method or algorithm can be used on the fully-connected layers, although other methods may be considered. The structure of an auxiliary input stream is similar to the one of a primary fully-connected stream illustrated in FIG. 14.

As it will become more apparent below, a fusion layer is used to fuse the outputs of the upstream layers (i.e., respective internal representation from the plurality of distinct primary streams and auxiliary streams) into a single vector.

This is required since at least one fully-connected layer is used to produce the output of the system, and as discussed above, a fully-connected layer accepts one and only one vector. This means that one or more fusion layers may be needed to fuse the outputs of the convolutional and auxiliary streams into a single vector to be used as the input to the output layer.

The inputs to this layer are the outputs of at least two upstream streams. If no fully-connected layers are used in a convolutional stream, the output of this stream needs to be flattened into a vector prior to a fusion operation, as previously described.

The fusion operation itself consists in concatenating the input vectors into a single vector whose length is equal to the sum of the length of all the input vectors. Fusion at this level is said to be feature fusion, as opposed to the prediction fusion used in the embodiment shown in FIG. 5. Feature fusion in a neural network can also be referred to as the fusion of internal representations.

An internal stream of neural layers is an optional set of fully-connected layers that can be used to apply further processing to the output of a fusion layer. The input of the stream is thus the output of a fusion layer. If one or more fully-connected layers are used, the output of the stream is a vector containing the same number of elements as there are in the last fully-connected layer. If no fully-connected layers are used, the output of this stream is its input, so the output of the fusion layer. The output of an internal stream can itself be used as an input to a fusion layer. L2 regularization and Dropout regularization method or algorithm can be used on the fully-connected layers, although other methods may be considered.

It should be noted that while fully-connected layers can exclusively be used in this type of stream, it is also possible to use 1D convolutional layers instead, given the potentially relatively high dimensionality of some inputs. Convolutional layers however appear to be inappropriate, mostly because this type of layer is meant to exploit relationships between neighboring values, or within a neighborhood of values. The structure of an internal stream is similar to the one of a primary fully-connected stream illustrated in FIG. 14.

As it will become more apparent below, in one embodiment, the output of the system is provided by a fully-connected layer of size one or two, depending on whether the system is to produce both X and Y gaze coordinates, or only one of these, as further described in more details below. In this embodiment, the input to this layer is either the output of an internal stream or the output of a fusion layer.

A great many activation functions are commonly used in Artificial Neural Networks, and any function can be used so long as it is differentiable. Such functions include but are not limited to: the identity function, the logistic function (such as the sigmoid function), the tan h function and the rectified linear unit (ReLU) function.

In one embodiment, the ReLU function is used for all layers except for the output layer, which used the identity function. Such embodiment has shown good results, but other functions may be used to yield models with different performance metrics.

Referring now to FIGS. 15 to 20, a method and a system for determining a gaze position of a user that rely on neural network architectures, according to some embodiments, will now be generally described in more details.

As it will become apparent below, in one embodiment of the method 10, the steps of determining a respective gaze position, or internal representation for neural networks as it is presently the case, and determining an estimated gaze position are performed in combination. Indeed, the at least one component image is processed using a neural network. The neural network is implemented by one or more computers and has one or more neural network layers. The neural network is configured to, at run time and after the neural network has been trained, process the at least one component image using the one or more neural network layers to generate the estimated gaze position. Training of the neural network will be described below.

This method is implemented using the system 80 previously described wherein the system is provided with a neural network. In this embodiment, the neural network is configured to, at run time and after the neural network has been trained, process the at least one component image using the one or more neural network layers to generate the estimated gaze position. In one embodiment, the system 80 has at least one primary stream forming a first portion of the neural network, each corresponding to a color component of the acquired images, each primary stream, each being configured to generate the respective internal representation to be fused with the others, and in some cases, to be also fused with the internal representation from auxiliary inputs such as illuminant values and facial landmark coordinates. In other words, in the case the three component images of an RGB image are used, the system 80 has three distinct primary streams, as it will become apparent below upon description of FIGS. 15 and 16. The system 80 also has a second portion of the neural network, i.e., the internal stream, configured to generate the estimated gaze position. As it should be apparent, the outputs of the first portion of the neural network (i.e., at least one primary stream from the at least one color component image, and the auxiliary streams, if any) are used as the inputs of the second portion of the neural network. Various architectures for the first neural networks may be used. It may comprise one or more fully-connected layers only and/or one or more convolutional layers. If convolutional layers are used, a fully-connected layer is provided downstream the last convolutional layer, as detailed below. The second portion of the neural network has at least one fusion layer, each having at least one fully-connected layer. This second portion of the neural network, or internal stream, starts from at least one of the at least one fusion layer. The second neural network may also comprise an output layer downstream the one or more fusion layer. The output layer may comprise one or more fully-connected layer.

Two general types of architectures will now be described with reference to FIGS. 15 and 16, in accordance with some embodiments. The architectures are only described generally since the specifics of the layers of the neural networks fall within the domain of hyperparameter optimization and many combinations of number of layer and layers parameters can be explored for a given architecture.

Figure 15:
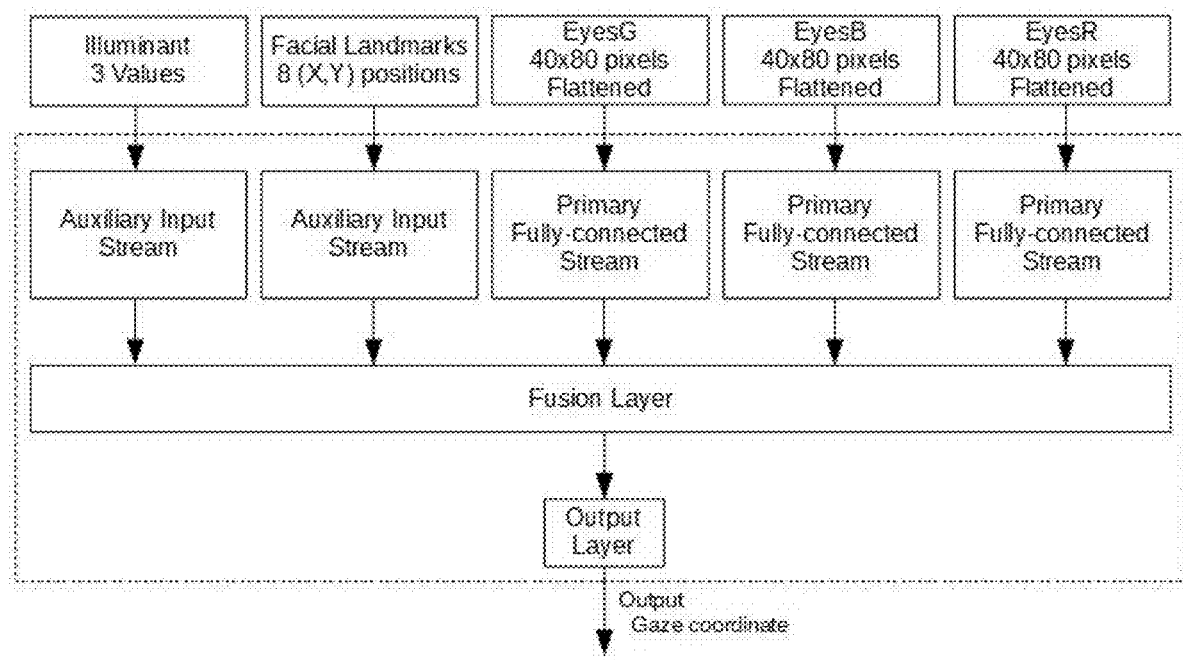
FIG. 15 is a schematic block diagram illustrating an architecture using a multi-layer perceptron for implementing the method of FIG. 1, according to one embodiment.

Referring now to FIG. 15, an embodiment of the system using a multi-layer perceptron will be described. This architecture contained five fully-connected streams of neural layers, one for each input. Three of the streams act as three distinct neural networks for the three color channels of the eye images, outputting a respective internal representation (not a network output) at the last layer thereof. The two remaining streams are auxiliary input streams, one for the illuminant values and one for the facial landmark coordinates. The outputs of these five streams are fused into a single vector with a fusion layer to be used as the input to an output layer. In this example, the fusion layer is comprised in the second neural network previously described.

As mentioned previously, a multi-layer perceptron is used to get an estimate of an appropriate model size, to provide a starting point to do hyperparameter optimization. In one embodiment, MLPs is chosen because they are much easier than ConvNets to condition properly, that is to choose a set of hyperparameters that produce a viable model. While the models trained under this architecture produced some viable results, MLPs are much less powerful than ConvNets on image processing problems. For this reason, ConvNets will be used in subsequent embodiments described below.

The architecture shown in FIG. 15 only contained input streams of neural layers and a fusion layer. There was no internal stream between the fusion layer and the output layer. Additionally, the eye images used were of size 40×80 pixels. The same size was used in early convolutional architectures, before it was increased to 80×160 pixels in an effort to improve results.

Figure 16:
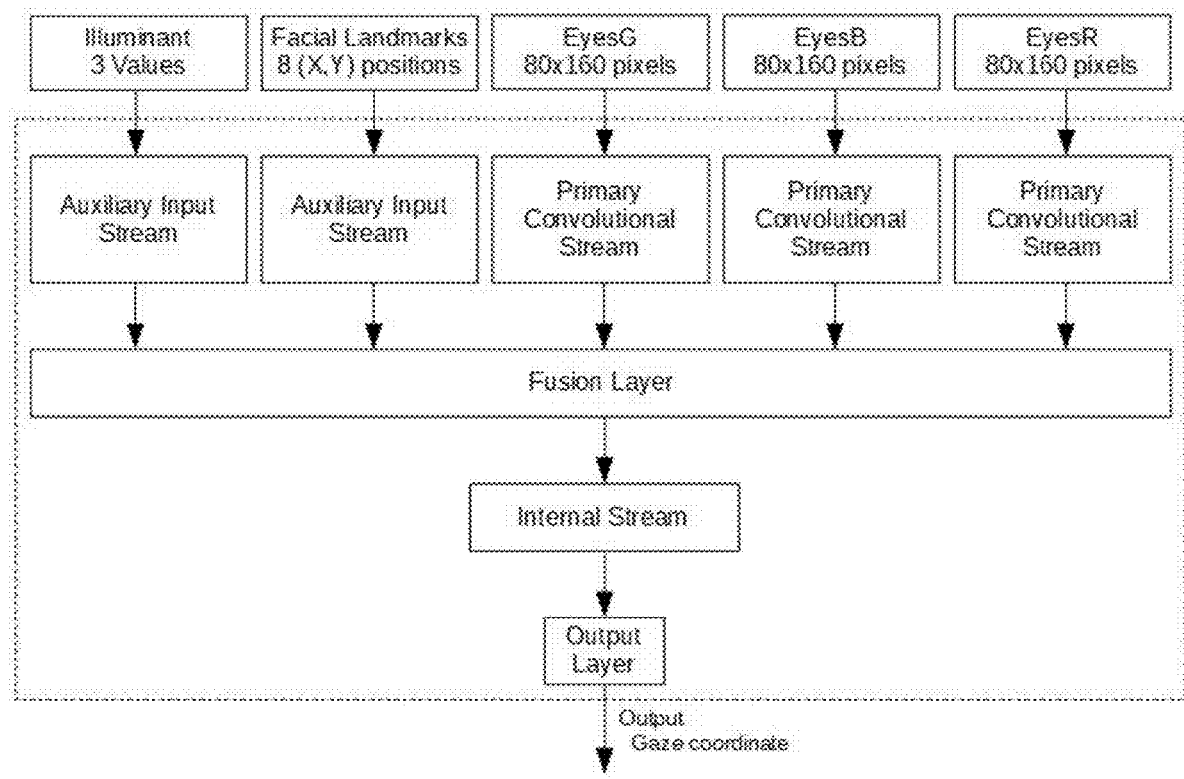
FIG. 16 is a schematic block diagram illustrating an architecture using a convolutional neural network for implementing the method of FIG. 1, according to another embodiment.

FIG. 16 shows an embodiment of the system using convolutional neural networks. Indeed, the architecture that appears to provide the best results uses three convolutional streams as the respective three first neural network streams, one for each of the color channels of the eye images, as well as two auxiliary input streams, one for the illuminant values and one for the facial landmark coordinates. A single fusion layer is used to fuse these five streams. The fusion layer is then fed into an internal stream, and the architecture is capped by the output layer which produces the gaze estimate.

Some attempts to fuse the convolutional streams and the auxiliary streams at different depths in the architecture were made, but they did not yield better results. In these architectures, and according to one embodiment, the convolutional streams would be fused in one fusion layer and the auxiliary streams would be fused in another. Internal streams would then be used to process the outputs of these two fusion layers. Another fusion layer would then fuse the outputs of these internal streams. The output of this fusion layer would be fed to a third internal stream, which would finally output to the output layer.

In order to implement such architectures, a training of the neural network has to be done. The used database was composed of 2.5 million face images, belonging to about 1500 people. The database was split into a training set, a validation set and a test set using a 70-20-10% split. These images were obtained from volunteers tasked to look at a series of stimuli on the screen of a mobile device of different screen sizes, be it a smartphone (such as an iPhone) or a tablet (such as an iPad). For each captured image, some metadata was captured which included: the device type, the screen size, the position of the stimulus in screen coordinates, the position of the stimulus in centimeters from the camera, the orientation of the device (one of portrait, portrait Upside Down, landscape Right, landscape Left), as detailed below.

In accordance with one exemplary embodiment, and without limitation, model training was performed on servers in the cloud, for instance an Amazon EC2 p3.8xlarge instance, using Keras and Tensorflow as machine learning function libraries. Model regularization included batch normalization on the convolutional layers, and L2 and Dropout on the fully-connected layers. The weight of the L2 regularization was 0.01 for all models. The Dropout rate was 25% for all models. These values were found empirically and may not represent the best possible values. The chosen architectures of the various models are given in Tables 1 to 3 below. For all convolutional layers, max pooling with size 2×2 was used. To simplify hyperparameter optimization, the same architecture is used for all convolutional streams, and the same architecture is used for both auxiliary streams.

Table 1 below shows the sizes of the convolutional layers. The layer sizes are given in the order that they are traversed by the data, so from input to output. For a convolution layer, X M×N kernels means that X number of kernels were used in this layer, with each kernel being of size M×N. Table 2 shows the number of layers in the auxiliary streams, and size of each layer. Table 3 shows the number of layers in the internal stream, and size of each layer.

TABLE 1

| Model | # Convolution Layers | Convolution Layer Sizes | # Fully-connected Layers | Fully-connected Layer Sizes |
|---|---|---|---|---|
| Portrait, horizontal | 3 | 16 11 × 11 kernels<br>8 5 × 5 kernels<br>4 3 × 3 kernels | 2 | 200 neurons<br>100 neurons |
| Portrait, vertical | 3 | 16 11 × 11 kernels<br>8 5 × 5 kernels<br>4 3 × 3 kernels | 3 | 200 neurons<br>100 neurons<br>50 neurons |
| Portrait Upside-Down, horizontal | 3 | 16 11 × 11 kernels<br>8 5 × 5 kernels<br>4 3 × 3 kernels | 2 | 200 neurons<br>100 neurons |
| Portrait Upside-Down, vertical | 3 | 16 11 × 11 kernels<br>8 5 × 5 kernels<br>4 3 × 3 kernels | 3 | 200 neurons<br>100 neurons<br>50 neurons |
| Landscape Right, horizontal | 3 | 16 11 × 11 kernels<br>8 5 × 5 kernels<br>4 3 × 3 kernels | 2 | 200 neurons<br>100 neurons |
| Landscape Right, vertical | 3 | 16 11 × 11 kernels<br>8 5 × 5 kernels<br>4 3 × 3 kernels | 3 | 200 neurons<br>100 neurons<br>50 neurons |
| Landscape Left, horizontal | 3 | 16 11 × 11 kernels<br>8 5 × 5 kernels<br>4 3 × 3 kernels | 2 | 200 neurons<br>100 neurons |
| Landscape Left, vertical | 3 | 16 11 × 11 kernels<br>8 5 × 5 kernels<br>4 3 × 3 kernels | 3 | 200 neurons<br>100 neurons<br>50 neurons |

TABLE 2

| Model | # Fully-connected Layers | Fully-connected Layer Sizes |
|---|---|---|
| Portrait, horizontal | 1 | 32 neurons |
| Portrait, vertical | 1 | 32 neurons |
| Portrait Upside-Down, horizontal | 1 | 32 neurons |
| Portrait Upside-Down, vertical | 1 | 32 neurons |
| Landscape Right, horizontal | 1 | 32 neurons |
| Landscape Right, vertical | 1 | 32 neurons |
| Landscape Left, horizontal | 1 | 32 neurons |
| Landscape Left, vertical | 1 | 32 neurons |

TABLE 3

| Model | # Fully-connected Layers | Fully-connected Layer Sizes |
|---|---|---|
| Portrait, horizontal | 3 | 182 neurons<br>91 neurons<br>45 neurons |
| Portrait, vertical | 2 | 107 neurons<br>53 neurons |
| Portrait Upside-Down, horizontal | 3 | 182 neurons<br>91 neurons<br>45 neurons |
| Portrait Upside- | 2 | 107 neurons |

TABLE 3-continued

| Model | # Fully-connected Layers | Fully-connected Layer Sizes |
|---|---|---|
| Down, vertical | | 53 neurons |
| Landscape Right, horizontal | 3 | 182 neurons |
| | | 91 neurons |
| | | 45 neurons |
| Landscape Right, vertical | 2 | 107 neurons |
| | | 53 neurons |
| Landscape Left, horizontal | 3 | 182 neurons |
| | | 91 neurons |
| | | 45 neurons |
| Landscape Left, vertical | 2 | 107 neurons |
| | | 53 neurons |

In the event that the algorithms previously described does not produce sufficiently accurate gaze estimates for a given application, a calibration procedure can be used during which a small dataset is collected from the specific user to adjust the general model's predictions.

For performing the calibration procedure, an additional set of pictures would need to be captured. For each of these captured pictures, some stimulus would be displayed on screen, whose position (the target) would be recorded and at which the user would need to look when the picture is taken. This would constitute the minimal database for the calibration procedure. This database could contain other metadata, such as device type, screen size, screen resolution and device orientation.

Figure 17:
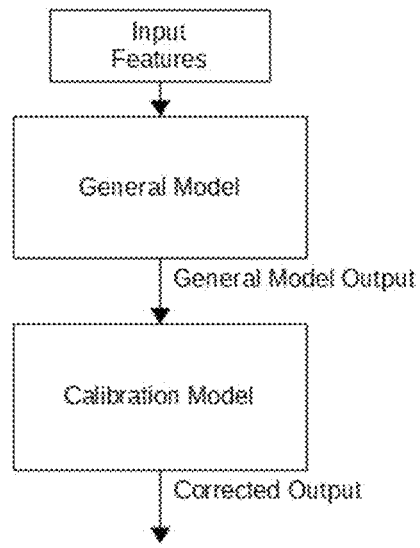
FIG. 17 is a schematic block diagram illustrating the method of FIG. 1, wherein a calibration model is used, according to one embodiment.

From there, for each captured image, the same features used by the general model would be extracted from the pictures and would be fed to the general model for processing. Here, two options are available to train the calibration model. One option, would be to capture the output of the general model for each image. These gaze estimates would constitute the inputs of the calibration model, while the true position of the stimulus at the time of image capture would be the target. Once trained, such a model would be appended to the output of the general model, taking it as an input and producing a new gaze coordinate. Such a model is shown in FIG. 17.

Figure 18:
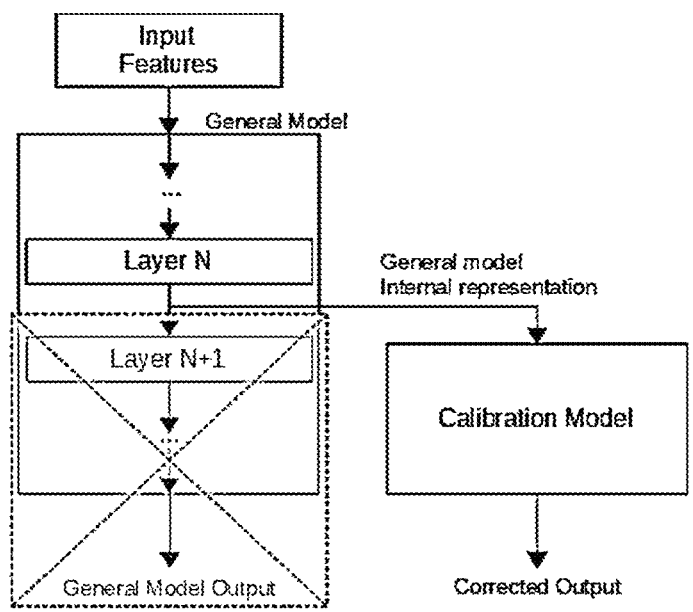
FIG. 18 is a schematic block diagram illustrating the method of FIG. 1, wherein another calibration model is used, according to another embodiment.

The second option, as illustrated in FIG. 18, would be to feed the features to the general model as described above, but capturing the output of a layer other than the output layer, so an internal representation of the model, as the input to the calibration model. The targets for training would again be the true position of the stimulus on screen at the time of image capture. Once trained, the calibration model would replace all of the layers downstream of the layer used for training, as illustrated.

The data collection procedure for the calibration database would involve showing a series of stimuli to the user, while ensuring that the screen is covered entirely and evenly, as known in the art. To ensure the quality of the data, the calibration procedure should also be kept as short as possible and should try to maximize user engagement.

Many strategies are available here. The stimuli could be made to appear at random locations throughout the screen, requiring the user to find each stimulus before the pictures are taken. The stimuli could be made to appear in a sequence between pairs of points on the screen, chosen at random, requiring the user to find the start point. The stimuli could be made to appear in a sequence between a set of predetermined, but disconnected pairs of points, thus making a single stimulus appear to move along a predetermined but disconnected path. Finally, the stimuli could be made to appear in a sequence along a predetermined, continuous path, thus creating the illusion of a single stimulus moving along said path. These strategies could be mixed, thus creating a calibration procedure during which each strategy is used for a certain amount of time.

In one embodiment, the chosen stimulus moves along a predetermined path while capturing a video of the user's face. The same effect could be achieved by capturing pictures at a certain framerate. By using this strategy, the user never has to find a new stimulus position after it having jumped, thus reducing the likelihood of bad datapoints being captured while the user was looking for the stimulus. This strategy also allows to capture a maximum of datapoints in a set amount of time, since by having the stimuli "jump" from location to location, some time would need to be allocated for the user to find the next stimulus to avoid the aforementioned problem. Finally, this strategy, being deterministic, allows the user to become familiar with the calibration procedure, thus increasing the likelihood of the user following the path of the stimulus exactly.

Once the data is captured, a machine learning algorithm needs to be chosen with which the calibration models will be trained. Given the relatively low complexity of the data, these algorithms would likely be the types of algorithms previously described, so ridge regression, decision trees, support vector machine, or even linear regression. More complex algorithms like artificial neural networks could also be used for a specific application.

Figure 19:
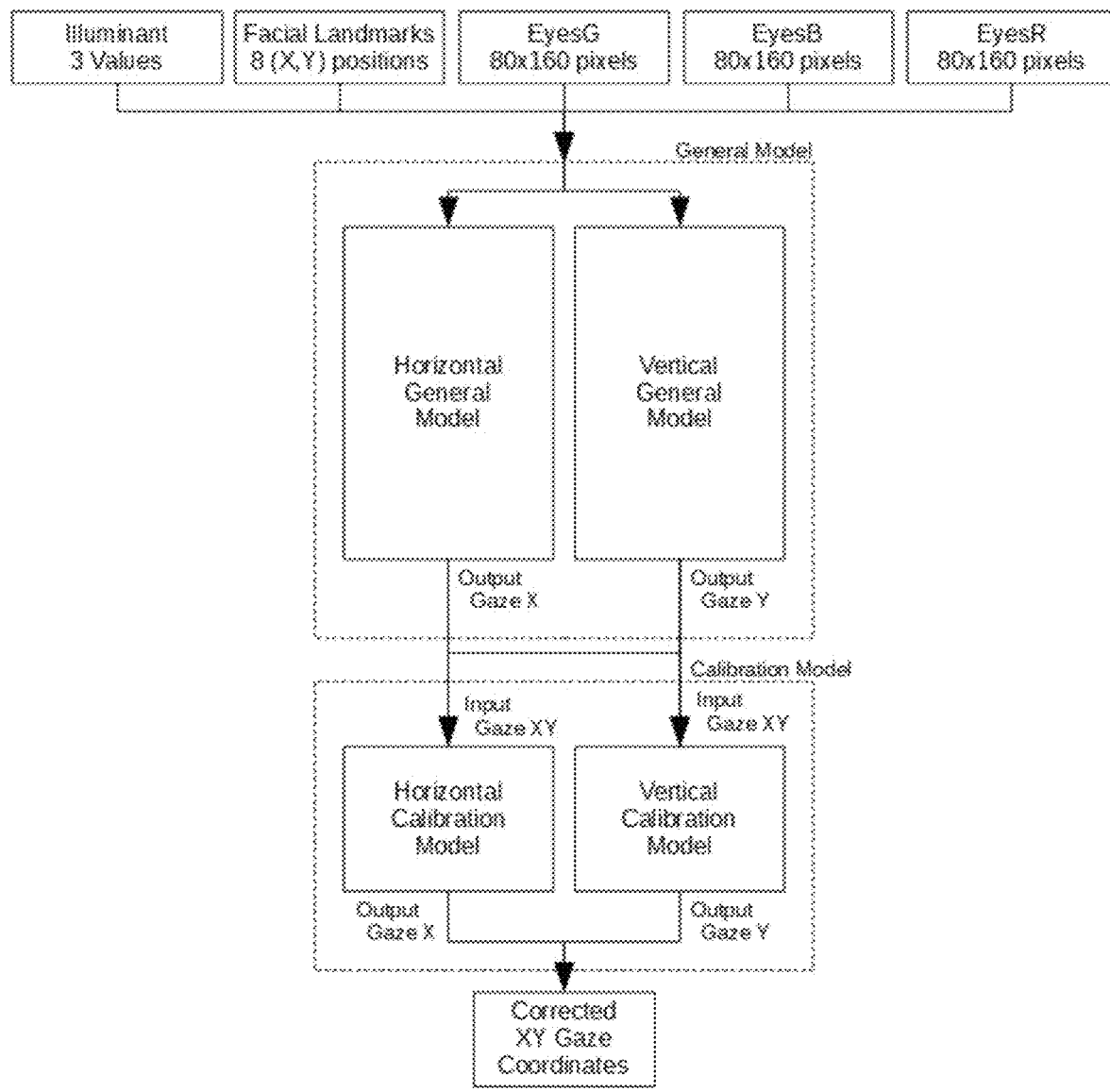
FIG. 19 is a schematic block diagram illustrating the method of FIG. 1, wherein the calibration model has a vertical calibration model and a horizontal calibration model, according to another embodiment.

FIG. 19 illustrates a schematic of the implementation of the proposed calibration model, according to one embodiment. The general model is composed of two subsystems, each of which takes in the same features and outputs either the X or the Y gaze coordinates. These gaze positions are then both fed to the calibration model, which is also composed of two subsystems. Each of those subsystems takes in both gaze coordinates and outputs either a corrected X or Y gaze coordinates.

Calibration models were then trained using support vector machines. For each device orientation, two calibration models were trained. Each model takes in the XY gaze coordinates output by the general models proper to the appropriate device orientation, and outputs either the X or Y corrected gaze coordinate. It would also have been possible to have a single model outputting both gaze coordinates, but tests have shown that the independent determination of X or Y corrected gaze coordinate provides better results.

Figure 20:
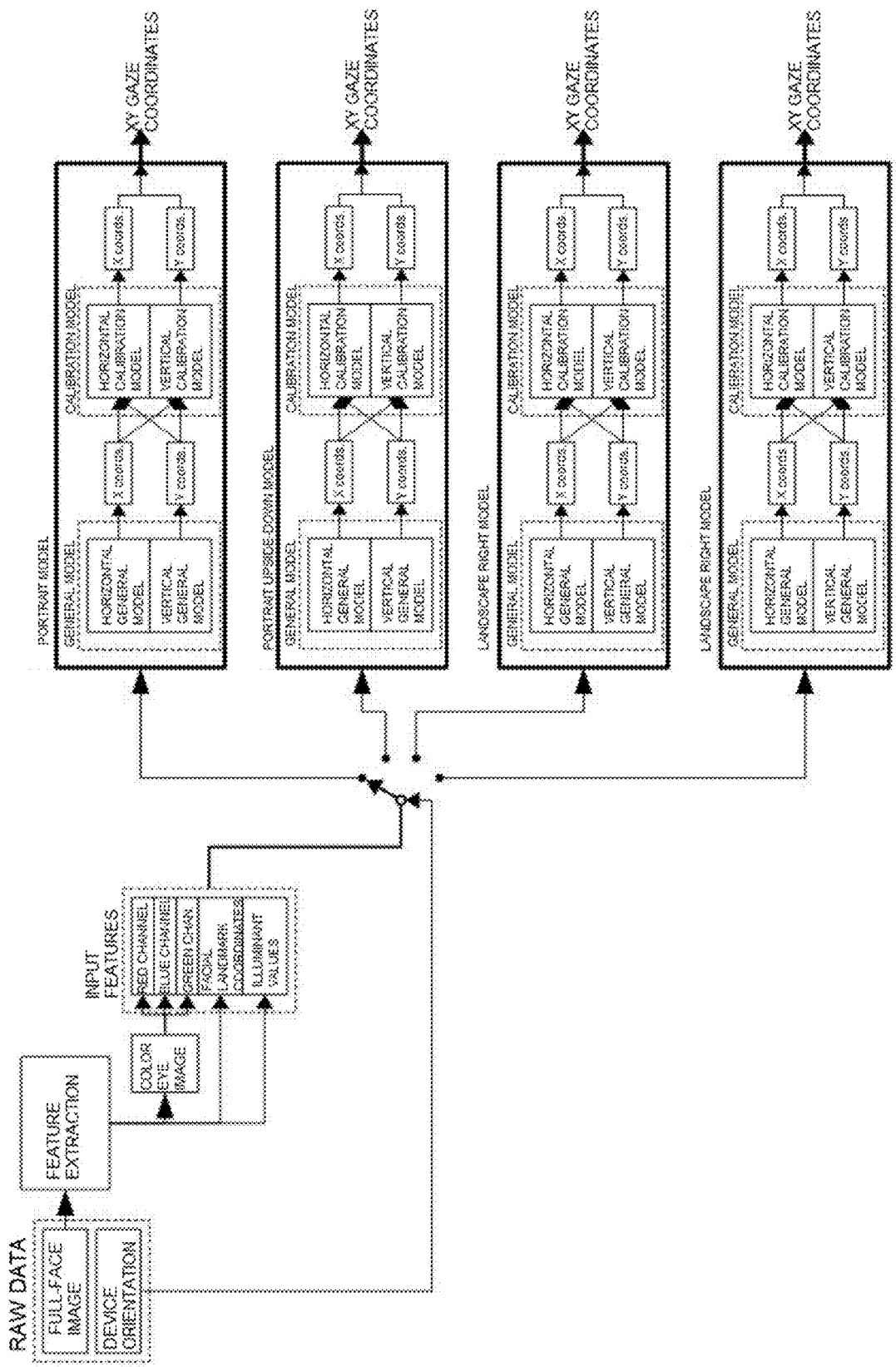
FIG. 20 is a detailed block diagram of an entire system for determining a gaze position of a user, according to one embodiment.

Reference is now made to FIG. 20 which shows an entire system for determining a gaze position of a user, according to one embodiment.

For every gaze position to be estimated, the device on which the system is installed will produce an image taken with a digital camera that shows the face of the user, and the orientation of the device or camera, depending on the system. For example, a smartphone or tablet device would use the front-facing camera, and would also provide the orientation of the device, while a desktop computer would use a webcam, typically mounted on top of a screen, and would provide the orientation of the webcam.

From the initial image, five input features are extracted. These features include the three crops of the original image that contains both of the user eyes, or the region of the face where the eyes would be. These features also include the XY coordinates of a set of facial landmarks, and the estimated illuminant values of the initial image.

The system has four prediction streams, one for each of the four following device orientations: portrait, portrait upside-down, landscape right and landscape left. Each of these prediction streams contains a general model and, if calibration has been performed for this orientation, a calibration model. Both the general and calibration models for each stream contain two subsystems. One subsystem estimates the horizontal gaze coordinate from the input features, while the other subsystem estimates the vertical gaze coordinates from the same features.

The predictions stream to be used is determined by the device orientation, which acts like a selector. The system could either have all streams produce a gaze position estimate, with the selector being used to select which output to use. Alternatively, the selector could be used to select which of the prediction streams should be used for a given feature set. The latter option enables to reduce computational costs.

The method described herein performs particularly well for making various applications involving gaze tracking for user interfaces, such as a user interface on a smartphone, on a tablet, or on a screen of some sort. Practical application involving interactions with contents appearing on these interfaces can be made by taking advantage of the high accuracy (smaller than 1 cm) that can be achieved using the present method. This accuracy is notably achieved by a judicious selection of input images (such as a concatenation of cropped eye images with the environment removed). This accuracy also originates from ensuring, through the architecture as described above, that the algorithm, namely the neural network, can adapt automatically to the illumination context and gives a preference to the internal representation originating from one of the color component images which gives the best results in that illumination context. The complete separation of color component images (e.g., three color-component images of the concatenated cropped eyes) before applying a distinct neural network stream to each of them, ensures that each one is treated distinctly and can later be selected alone for further treatment by the neural network using the most appropriate color component image given the illumination context.

The method described herein performs particularly well when compared to other methods found in the literature, for example the study made by Krafka et al., "Eye Tracking for Everyone" from MIT, available at http://gazecapture.csail.mit.edu/cvpr2016_gazecapture.pdf. This study uses four inputs: each separate eye (cropped), the whole image, and a binary mask indicating face position in the image.

The present invention describes using only facial landmark coordinates and not the whole face. In the MIT project, the first layer needs considerable time to be trained to identify a person's head and its position in the complete image. The presence in the image of the environment around the head is superfluous and complicates the training of the model. The MIT model also indicates a precision of 1.34 cm-2.12 cm on mobile phones. This accuracy is not sufficient for real-life applications such as the identification of keyboard elements which have a screen height or width below 1 cm. The method describes herein takes advantage of inputs and an architecture which allow identifying the buttons of a typical smartphone keyboard, with an accuracy in either X or Y below 1 cm, therefore sufficient for real-life applications. This is at least because we have identified that using the whole image being acquired is not useful and requires significant computational resources. In the present method, in addition to the composite image of the cropped eye images (cropped images of the eyes put together in single image) used as the input for color component images, the facial landmark coordinates (alone) are fed to the first layer of the network. The requirement for computational resources is thereby reduced. Instead of the whole picture of the environment fed to the neural network, we use the illuminant values as a proxy for the environmental conditions, again reducing the requirement for computational resources, both in real-time application and during training. Moreover, the MIT project failed to identify the benefit of separating RGB components of the image at the input as described herein, which also provides technical advantages in terms of accuracy when detecting edges in the eye anatomy that are useful for gaze tracking.

The method described herein also performs particularly well when compared to other methods found in the literature. For example, Zhang et al., available at https://arxiv.org/pdf/1504.02863.pdf, describes a method which is only sequential, with no parallel networks. They also teach using only one eye, from which they lose accuracy. The method also solves a different problem, namely finding an eye angle, which has its own specificities as it does not deal with head position, which needs to be taken into account if the desired output is ax X, Y position.

The method described herein also performs particularly well when compared to EVA Facial Mouse, a mobile application developed by Vodafon and available at http://www-.fundacionvodafone.es/app/eva-facial-mouse. This application uses facial movements, not the eyes, to control the mouse pointer on a device screen. This is not at all applicable to a completely paralyzed person, who cannot move their face.

The method described herein also performs particularly well when compared to U.S. Pat. No. 10,127,680. In this document, there is no prior training of the network. Calibration images need to be fed to the network in the first place. After collecting calibration images, the network is trained. Actual accuracy is expected to be very low due to various factors, notably the lack of training of the network. This method should therefore not be expected to work in real-life conditions as it is described therein.

The hardware necessary to perform the method includes any device capable of image acquisition, which is normally called a camera. The camera is essential as it collects the images in a proper format at a proper rate and color conditions to be fed to the analysis system. Since the analysis system needs to be trained, an appropriate computer system needs to be used. This appropriate computer system is required for training, but may not be required for steps other than training. Actual real-time gaze determination needs to be performed by a computer system, but the requirements for computing power can normally be met by a typical mobile device such as a smartphone or tablet of good quality. Therefore, having a computer system (not necessarily the same one as for training) in communication with the camera for image acquisition is essential for running the method.

Computing may be performed in various specific manners depending on the context. As stated above, training of the system needs a significant computing power to be performed, but once it is trained, the algorithms can run on a simpler computer such as a tablet computer. However, if calibration needs to be done, calibration images can be advantageously sent over a network to a remote server (or to a server in a cloud computing arrangement) where the calibration model can be prepared. Once the model is calibrated on the remote server (with a presumably more significant computing power than a tablet or smartphone), the calibrated model is sent back to the tablet or smartphone or other similar device for actual use of the calibrated model, locally, on the client computer. One may also contemplate performing the calibration directly on the client computer, assuming it has enough computing power to do so and also assuming the complete calibration model is installed thereon, in which case the step of sending calibrations images to a remote server and retrieving a calibrated model can be bypassed.

The embodiments of the gaze tracking method described above can be used for various purposes. An example of an implementation of the gaze-tracking method described above, can involve using it in an application installed on an electronic device such as a smartphone, tablet and the like, for tracking the gaze of the user with respect to the screen in order to trigger operations thereon, or collect information, related to what is presented on the screen.

The output of the method, i.e., X, Y coordinates with respect to a reference point defined with respect from the camera, can be transformed to a screen coordinate using other inputs. For example, the relative position (normally fixed) between the camera and a reference point (e.g., the top left corner of the screen) should be known, as well as the screen size and screen resolution which can be queried in the device settings/parameters by the mobile application installed on the device. Using these data, the X, Y output can be transformed to pixel coordinate on the screen, or any other equivalent thereof. If only an X or Y value is needed, then this is transformed into a pixel row or column on the screen.

Using this transformation into a screen location being looked at can be useful to provide a way for a user to interact with the contents presented on the screen being looked at using only eye movements. Other types of body movement may exist but are not required to use the method described above, as eye direction is sufficient. This is useful for a user who is paralyzed or suffers from another problem which prevents all movements (including small facial movements) and verbal communication. Usually, a paralyzed person is able to move their eyes.

For example, on-screen elements which make up the graphical user interface can be triggered or actuated using only the gaze, identified by the method as being pointing toward them. These on-screen elements can include buttons, links, keyboard elements, and the like. Integrating the gaze-tracking method with the larger context of electronic device usage can therefore ensure proper interactivity of the paralyzed person with the screen of the electronic device, thereby using a user interface effectively using their eyes only. This requires the gaze-tracking application to communicate the results of the tracking in terms of screen position to the operating system of the device or to applications running thereon, to allow real-time interactivity, as if the person was using a mouse pointer or tapping on a touch screen. If the method is applied in such a context, then the use of the electronic device having a screen becomes essential.

Other applications can also be contemplated, for example by assessing where on a display element of some sort the person is looking. For example, a camera may acquire images of a person looking at a poster or panel and the method can be used to identify the location on the poster or panel where the person is looking. This can also apply to user interfaces which are displayed using technologies other than a device screen, for example using projection or immersive environments. The method can therefore determine, through geometrical transformations of the referential (e.g., into a pixel location on the screen), that the person is looking at displayed user-interface elements such as buttons, links, keyboard elements, and the like, on a projected image or virtual image, and user interaction with the interface elements can then be triggered.

Although the above description relates to specific preferred embodiments as presently contemplated by the inventors, it will be understood that the invention in its broad aspect includes physical and functional equivalents of the elements described herein.

The invention claimed is:

1. A system for determining a gaze position of a user, comprising:
an extracting unit configured for receiving an initial image of at least one eye of the user and extracting at least one color component of the initial image to obtain a corresponding at least one component image;
an internal representation determining unit configured for applying a respective primary stream to each one of the at least one component image to obtain a respective internal representation for each one of the at least one component image; and
a gaze position estimating unit configured for determining an estimated gaze position in the initial image according to the respective internal representation of each of the at least one component image and outputting the estimated gaze position.

2. The system for determining a gaze position of claim 1, wherein the internal representation determining unit and the gaze position estimating unit are part of a neural network implemented by one or more computers and comprising one or more neural network layers, and wherein the neural network is configured to, at run time and after the neural network has been trained, process the at least one component image using the one or more neural network layers to generate the estimated gaze position.

3. The system of claim 2, wherein the neural network comprises:
at least one first neural network stream, each being configured to generate the respective internal representation; and
a second neural network stream configured to generate the estimated gaze position.

4. The system of claim 3, wherein the extracting unit is further configured for:
identifying the at least one eye within the received initial image using a facial feature or landmark recognition method;
extracting a portion of the initial image containing only the at least one eye to obtain a cropped image; and
extracting the at least one color component of the cropped image to obtain the corresponding at least one component image.

5. The system of claim 1, further comprising a camera for acquiring the initial image of at least one eye of the user.

6. The system of claim 5, further comprising an electronic device having a screen to which estimated gaze position relates.

7. The system of claim 6, wherein the electronic device comprises the camera.

8. A computer-implemented method for determining a gaze position of a user, comprising:
receiving an initial image of at least one eye of the user;
extracting at least one color component of the initial image to obtain a corresponding at least one component image;

applying a respective primary stream to each one of the at least one component image to obtain a respective internal representation for each one of the at least one component image;
determining an estimated gaze position for the initial image using the respective internal representation for each of the at least one component image; and
outputting the estimated gaze position.

9. The computer-implemented method of claim 8, wherein said applying the primary stream to obtain the respective internal representation and said determining an estimated gaze position are performed in combination and comprise:
processing the at least one component image using a neural network, at least one portion of the neural network being the respective primary stream respective to each of the at least one component image, wherein the neural network is implemented by one or more computers and comprises one or more neural network layers, and wherein the neural network is configured to, at run time and after the neural network has been trained, process the at least one component image using the one or more neural network layers to generate the estimated gaze position.

10. The computer-implemented method of claim 9, wherein said applying the respective primary stream to obtain the respective internal representation is performed separately for each of the at least one component image, and comprises at least one convolutional layer and at least one fully-connected layer downstream of the at least one convolutional layer for each one of the at least one component image.

11. The computer-implemented method of claims 10, wherein the neural network comprises another portion, namely an internal stream, downstream the respective primary stream, wherein said determining an estimated gaze position is performed using the internal stream comprising at least one fusion layer, the internal stream having at least one fully-connected layer.

12. The computer-implemented method of claim 11, wherein the internal stream starts at a fusion layer receiving at least the respective internal representation and further comprises an output layer downstream the fusion layer and comprising at least one fully-connected layer.

13. The computer-implemented method of claim 8, wherein said extracting at least one color component comprises extracting each of three RGB components of the initial image.

14. The computer-implemented method of claim 8, further comprising:
identifying the at least one eye within the received initial image using a facial feature or landmark recognition method; and
extracting a portion of the initial image containing only the at least one eye, thereby obtaining a cropped image, wherein said extracting at least one color component is performed in the cropped image to obtain the corresponding at least one component image.

15. The computer-implemented method of claim 14, wherein said identifying the at least one eye comprises identifying at least one of: an outline of the at least one eye, a position of at least one of a limbus, an iris and a pupil of the at least one eye.

16. The computer-implemented method of claim 15, wherein said extracting at least one color component comprises extracting at least two distinct color components of the initial image to obtain at least two corresponding component images, the method further comprising:
for each of the at least two corresponding component images, determining an illuminant value representative of the relative contribution of the each of the at least two corresponding component images to the initial image,
wherein said determining an estimated gaze position further comprises combining the illuminant values with the respective internal representation of the at least one component image.

17. The computer-implemented method of claim 16, wherein the illuminant values are processed using an illuminant neural network comprising one or more fully-connected neural network layers.

18. The computer-implemented method of claim 17, wherein the received initial image further contains at least one facial landmark, the method further comprising:
extracting the at least one facial landmark to obtain a corresponding at least one landmark position;
wherein said determining an estimated gaze position further comprises combining the at least one landmark position with the respective internal representation of the at least one component image, wherein said combining is performed using a landmark neural network comprising one or more fully-connected neural network layers.

19. The computer-implemented method of claim 18, wherein said combining is performed using a landmark neural network comprising one or more fully-connected neural network layers.

20. The computer-implemented method of claim 8, further comprising determining the estimated gaze position relative to a screen of an electronic device using a referential transformation, comprising querying screen properties of the electronic device for performing the referential transformation, and performing user interactions with the electronic device based on the determining the estimated gaze position relative to the screen of the electronic device.

* * * * *